US009558514B2

(12) United States Patent
Jung et al.

(10) Patent No.: US 9,558,514 B2
(45) Date of Patent: Jan. 31, 2017

(54) CONSIDERING SELLING EXEMPLAR-BASED GOODS, ITEMS, OR SERVICES

(71) Applicant: SEARETE LLC, Bellevue, WA (US)

(72) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 14/095,778

(22) Filed: Dec. 3, 2013

(65) Prior Publication Data

US 2014/0164185 A1    Jun. 12, 2014

Related U.S. Application Data

(63) Continuation of application No. 12/799,390, filed on Apr. 23, 2010, now Pat. No. 8,600,832, which is a continuation-in-part of application No. 11/368,356, filed on Mar. 3, 2006, now abandoned, which is a continuation-in-part of application No. 11/366,200, filed on Mar. 2, 2006.

(51) Int. Cl.
*G06Q 30/00*     (2012.01)
*G06Q 30/06*     (2012.01)
*G06Q 10/08*     (2012.01)

(52) U.S. Cl.
CPC ........ *G06Q 30/0623* (2013.01); *G06Q 10/083* (2013.01); *G06Q 30/0601* (2013.01); *G06Q 30/0603* (2013.01)

(58) Field of Classification Search
CPC    G06Q 10/83; G06Q 30/0601; G06Q 30/0603; G06Q 30/0623
USPC ....................................................... 705/26, 27
See application file for complete search history.

(56) References Cited

U.S. PATENT DOCUMENTS 4,973,952 A    11/1990  Malec et al.
5,424,524 A     6/1995  Ruppert et al.
(Continued)

OTHER PUBLICATIONS

Neven Vision: "See it, snap it, and let your phone find it on the web: why type a web search into your mobile phone when you can simply show it what you want to find?" New Scientist, v189n2533p20(2) Jan. 7, 2006; Biever, Celeste; Dialog file 16 #12899625, 3pgs.*

*Primary Examiner* — Rob Pond

(57) ABSTRACT

One aspect relates to managing deliveries of at least one goods, items, and/or services that could be received by at least one customer, at least partially by recognizing an exemplar as corresponding to the at least one goods, items, and/or services. Another aspect relates to considering selling goods, items, and/or services from an exemplar merchant and/or store at least partially utilizing an exemplar item information as derived from a customer's previous history, wherein at least some of the exemplar item information as derived from the customer's previous history could be stored in certain embodiments of at least a portion of a shopping control mechanism. Yet another aspect relates to receiving an exemplar item information that can be used to recognize an exemplar as corresponding to an at least one goods, items, and/or services.

17 Claims, 21 Drawing Sheets

(56) References Cited

U.S. PATENT DOCUMENTS

| | | |
|---|---|---|
| 5,644,723 A | 7/1997 | Deaton et al. |
| 5,845,263 A | 12/1998 | Camaisa et al. |
| 5,897,622 A | 4/1999 | Blinn et al. |
| 5,969,968 A | 10/1999 | Pentel |
| 6,324,476 B1 * | 11/2001 | Trovato ................. 701/301 |
| 6,785,660 B1 | 8/2004 | Fedor et al. |
| 6,837,436 B2 | 1/2005 | Swartz et al. |
| 6,873,967 B1 | 3/2005 | Kalagnanam et al. |
| 6,873,968 B2 | 3/2005 | Ehrlich et al. |
| 6,876,977 B1 | 4/2005 | Marks |
| 6,941,282 B1 | 9/2005 | Johnson |
| 7,024,020 B2 | 4/2006 | Lee et al. |
| 8,589,984 B1 | 11/2013 | Acharya et al. |
| 2001/0049636 A1 * | 12/2001 | Hudda et al. .............. 705/26 |
| 2003/0125963 A1 * | 7/2003 | Haken ....................... 705/1 |
| 2003/0200152 A1 | 10/2003 | Divekar |
| 2004/0039592 A1 | 2/2004 | Shima |
| 2004/0078276 A1 | 4/2004 | Shimogori |
| 2004/0215526 A1 | 10/2004 | Luo et al. |
| 2004/0236635 A1 | 11/2004 | Publicover |
| 2004/0252025 A1 | 12/2004 | Silverbrook et al. |
| 2005/0160006 A1 | 7/2005 | Pate |
| 2005/0177463 A1 | 8/2005 | Crutchfield, Jr. et al. |
| 2005/0198095 A1 * | 9/2005 | Du ................. G06Q 10/087 709/200 |
| 2006/0034201 A1 | 2/2006 | Umeda et al. |
| 2006/0234631 A1 | 10/2006 | Diequez |
| 2006/0251338 A1 * | 11/2006 | Gokturk et al. ........... 382/305 |
| 2006/0282398 A1 | 12/2006 | Mueller et al. |
| 2007/0084918 A1 | 4/2007 | Tabet et al. |
| 2007/0143256 A1 | 6/2007 | Starr |
| 2007/0150360 A1 | 6/2007 | Getz |
| 2009/0271271 A1 | 10/2009 | Johnson |
| 2012/0078700 A1 | 3/2012 | Pugliese, III et al. |

* cited by examiner considering selling goods, items, and/or services from an exemplar merchant and/or store at least partially utilizing an exemplar item information as derived from a customer's previous history, wherein at least some of the exemplar item information as derived from the customer's previous history could be stored in certain embodiments of at least a portion of a shopping control mechanism 3202

FIG. 13

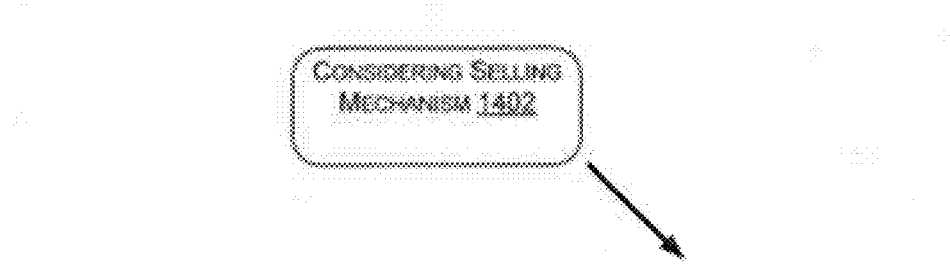

FIG. 14

3600 offering for sale goods, items, and/or services at least in part by a shopping control mechanism, wherein the goods, items, and/or services could have been purchased remotely by customers at least partially based on at least one exemplar item information that can be used to recognize an exemplar as corresponding to the goods, items, and/or services 3602 wherein the at least one exemplar item information can be derived at least in part from a customer's previously derived exemplar shopping history 3630 wherein the offering for sale goods, items, and/or services at least in part utilizing a shopping control mechanism which at least partially uses the at least one exemplar item information that is derived from a customer's previously derived exemplar shopping history 3632 further comprising delivering the goods, items, and/or services that have been purchased remotely to a customer at least partially using the at least one exemplar item information derived from the customer's previously derived exemplar shopping history 3634

FIG. 17

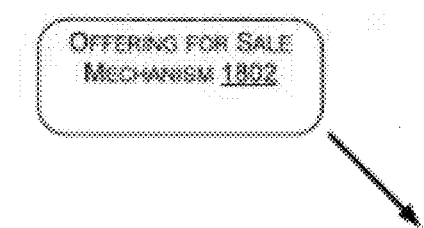

CONSIDERING SELLING EXEMPLAR-BASED GOODS, ITEMS, OR SERVICES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

PRIORITY APPLICATIONS

For purposes of For purposes of the USPTO extra-statutory requirements, the present application constitutes a continuation-in-part of United States patent application entitled CONSIDERING SELLING EXEMPLAR-BASED GOODS, ITEMS, OR SERVICES, naming Edward K. Y. Jung, Royce A. Levien, Robert W. Lord, Mark A. Malamud, and John D. Rinaldo, Jr. as inventors, U.S. application Ser. No. 12/799,390, filed Apr. 23, 2010, which is currently co-pending or is an application of which a currently co-pending application is entitled to the benefit of the filing date.

For purposes of the USPTO extra-statutory requirements, the present application constitutes a continuation-in-part of United States patent application entitled CONSIDERING SELLING EXEMPLAR-BASED GOODS, ITEMS, OR SERVICES, naming Edward K. Y. Jung, Royce A. Levien, Robert W. Lord, Mark A. Malamud, and John D. Rinaldo, Jr. as inventors, U.S. application Ser. No. 11/368,356, filed Mar. 3, 2006, which is currently abandoned but is an application of which a currently co-pending application is entitled to the benefit of the filing date.

For purposes of the USPTO extra-statutory requirements, the present application constitutes a continuation-in-part of United States patent application entitled SHOPPING USING EXEMPLARS naming Edward K. Y. Jung, Royce A. Levien, Robert W. Lord, Mark A. Malamud, and John D. Rinaldo, Jr. as inventors, U.S. application Ser. No. 11/366,200, filed Mar. 2, 2006, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

In certain aspects, this disclosure relates to, but is not limited to, shopping. In addition, further aspects, embodiments, and features will become apparent by reference to the drawings and the following detailed description.

BRIEF DESCRIPTION OF THE FIGURES

FIG. 11, which includes

FIG. 13 is a flow chart of another embodiment of an exemplar selling technique.

FIG. 14 shows a block diagram including one embodiment of a selling mechanism.

FIG. 17 is a flow chart of an embodiment of an exemplar receiving technique.

FIG. 18 shows a block diagram including one embodiment of an offering for sale mechanism.

DETAILED DESCRIPTION

Figure 1:
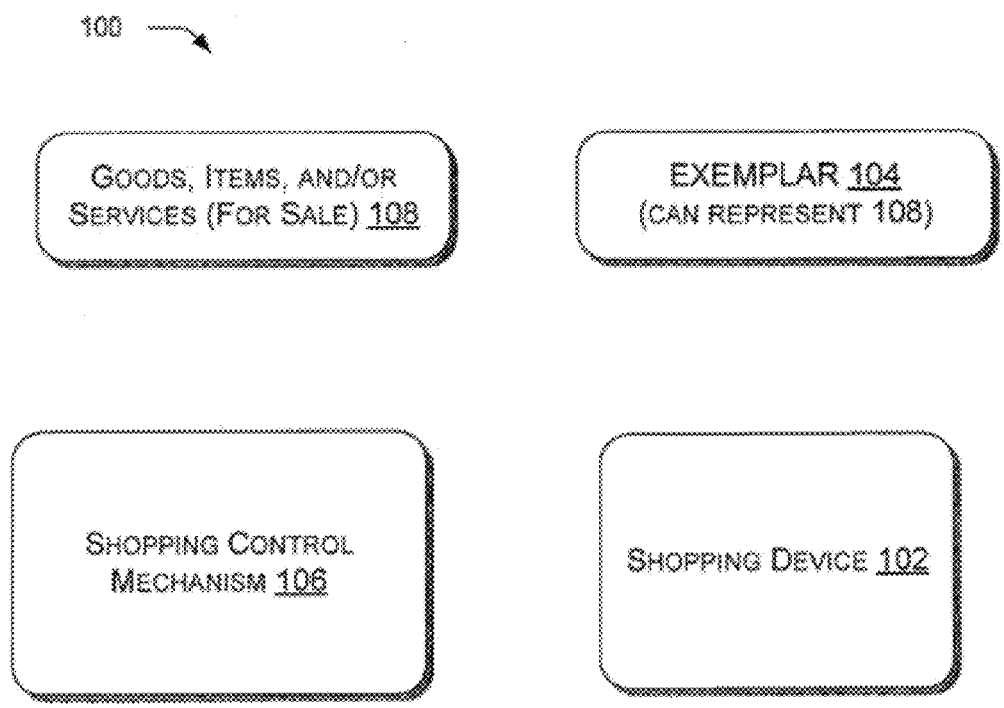
FIG. 1 is a block diagram of one embodiment of an exemplar shopping mechanism.

At least certain portions of the text (e.g., claims and/or detailed description) and/or drawings as set forth herein can support various different applications. Although, for sake of convenience of understanding, the detailed description includes section headings that generally track the titles of the various different supported applications, it is to be understood that support for the various applications appears throughout the text and/or drawings, irrespective of the section headings.

I. Certain Embodiments of Exemplars

This disclosure relates, in general, to selling, considering selling, or delivery of goods (e.g., to a customer or shopper) at least partially using exemplars. Within this disclosure, exemplars can be used to represent large variety of the goods, items, and/or services. Exemplars can be as varied as to represent those items that can be for sale, or may be offered for sale. A number of embodiments of the exemplars, as well as a number of techniques for shopping utilizing the exemplars, and/or within exemplar merchants and/or stores, as described within this disclosure, could considerably alter the shopping experiences for shoppers. The effective use of certain embodiments of the exemplar could result in more efficient, usable, user friendly, and/or attractive shopping space. Also, certain embodiments of the "exemplar merchant and/or store", as described in this disclosure, could at least partially utilize exemplars to carry a wide variety of goods, items, and/or services that could be quickly modified depending on upon such issues as customer demands, location, profitability, etc.

Certain embodiments of the goods, items, and/or services could include, depending on context, computer software, hardware, firmware, services, etc. Certain embodiments of exemplar merchants and/or stores utilizing exemplars could be quickly established at a variety of locations at relatively little expense, and can be utilized to be extremely reactive to customer input to efficiently provide customers the goods, items, and/or services for which they are seeking.

Certain traditional stores could also be converted into exemplar merchants or stores that could, or might not, offer similar goods, items, and/or services as the traditional store.

Certain embodiments of shopping can utilize a shopping device to be associated with an exemplar to identify, or determine, goods, items, and/or services to be purchased. It has been said that imitation is the sincerest form of flattery. As such, certain embodiments of exemplars that may be worn or used by, people who may, or may not be professional models, or simply may be typical people who might or might not be known by the customer as described with respect to FIG. 2. Certain embodiments of exemplars may not even be associated with people or animals, such as, for example, a manufactured item (e.g., a "widget", or mechanical, electrical, chemical, or other item or product as described with respect to FIG. 5) that could be in some easy to access, difficult to access, convenient, or remote location. As such, virtually anything that can be used to represent any goods, items, or services, which can be sold or offered for sale may be considered to be sold, may be used as an exemplar. In certain embodiments, the closer the "thing" or "service" can represent the goods, items, and/or services; the better the thing or service can function as the exemplar. The use of exemplar shopping could, in certain instances, allow shoppers to more readily shop for goods, items, and/or services similar or identical to those that they see and like. Such embodiments of shopping may occur whether or not the original goods, items, or service is for sale by the person wearing or using the goods, items, and/or services. Certain embodiments of exemplars, as described with respect to this disclosure, can provide a mechanism by which individuals or shoppers can identify goods, items, and/or services being provided, used, worn, or sold by another. Certain embodiments of the shopping device can be utilized in a retail location or manufacturing location, such as the exemplar merchant and/or store to identify one more goods, items, and/or services that a shopper wishes to purchase. Certain embodiments of the shopping device can be used outside, in a home, in a business, or in some other location such that a shopper can identify their goods, items, and/or services to be purchased.

Within this disclosure, the term "shopping" can include but is not limited to such actions as buying, offering, to buy, considering selling, offering to sell, considering selling, buying, perusing, pricing, evaluating, etc. Within this disclosure, the terms "selling", offering for sale, or "considering selling" can be considered similar, depending upon context.

FIG. 1 shows one embodiment of an exemplar shopping mechanism 100 including a shopping device 102, an exemplar 104, a shopping control mechanism 106, and (at least one) goods, items, and/or services for sale 108. Certain embodiments of the shopping device 102 can be utilized by a shopper to interact with the exemplar 104, or some goods, items, and/or services associated with the exemplar. In certain embodiments, the shopping device 102 can, based upon this interaction, recognize and/or identify the at least one of the goods, items, and/or services 108 that could be purchased and/or sold. There can be a large variety of exemplar shopping mechanisms 100 as described in this disclosure that can rely largely upon interaction between the shopping device 102, the exemplar 104, and the shopping control mechanism 106.

II. Certain Embodiments of the Shopping Device

With different embodiments of the exemplar shopping mechanism 100, the control or ownership of different embodiments of at least portions of the shopping device 102, different embodiments of at least portions of the exemplar 104, and/or different embodiments of at least portions of the shopping control mechanism 106 can be provided to the customer, the merchant or store, and/or some third-party (e.g., perhaps in some agent, employer, employee, or other arrangement). It should be recognized that selling, considering selling, or offering for sale of different types of the goods, items, and/or services could be provided by utilizing varied embodiments of the exemplar shopping mechanism 100, including its various components as described in this disclosure. In certain embodiments, the shopping device 102, the exemplar 104, and/or the shopping control mechanism 106 can be utilized in different shopping operations for different customers, different merchants or stores, etc. For example, certain embodiments of the shopping device 102 could be utilized by the single number of the household as a customer, or multiple members of the household. Similarly, certain embodiments of the shopping device 102 could be utilized by different employees, agents, or individuals associated with a particular company, club, group, etc. Certain embodiments of the shopping device could be used with different exemplar merchants or stores. The individual who is using the shopping device 102 or the shopping control mechanism 106, for example, is thereby assumed to have some association with the owner of the respective shopping device or shopping control mechanism.

Certain embodiments of the shopping control mechanism 106, may be typically under the control of the merchant, store, retailer, or manufacturer (but in certain embodiments not the customer). In certain instances, the shopping control mechanism 106 can be under the control of certain agents or distributors, such as can be analogize to the Tupperware party type of exemplar shopping. As such, a variety of "middle-level" customers can sell, or offer for sale, the goods, items, and/or services. In certain instances, the exemplar merchant or store that can provide or manufacturer the goods, items, or services can even provide some financial or other incentive for such middle-level customers. As such, certain embodiments of the middle-level customers can readily become exemplar merchants or stores themselves, especially if they have some commercial success selling, or considering selling, the goods, items, or services.

Certain embodiments of the shopping control mechanism could provide an interface by which shoppers and/or potential buyers can pay for items, services, or goods, which they may consider purchasing. In certain embodiments, the shopping control mechanism can be under the control of and/or be operated by the exemplar merchant or store (or perhaps an agent or employee thereof). In certain embodiments, the exemplars 104 can identify the goods, items, and/or services sufficiently well such that the seller is aware of the particular goods, items, and/or services that the customer is considering selling, considering selling, offering for sale, purchasing, or shopping for goods, items, and/or services. A variety of embodiments of the shopping device 102 can be configured to transmit some exemplar item information to the shopping control mechanism 106 to be used to at least partially identify the goods, items, and/or services that could be purchased or sold. In certain embodiments, a shopper can provide shopper input either into the shopping device, the shopper control mechanism 106, and/or another intermediate device (not shown, but a variety of networking devices such as routers could be utilized). Certain embodiments of the exemplar item information can be combined with the shopper input and/or other buyer information to further define the goods, items, and/or services that can be purchased. Shopper input can include such illustrative, but non-limiting, information as sizes of clothes, numbers of goods, items, and/or services to be purchased, accessories to consider purchasing, dimensions of goods or items to be purchased, colors, and/or particulars of the services, etc.

The shopping device 102 and the shopping control mechanism 106 can be configured to interact in a variety of manners and/or utilize a variety of technologies to provide different embodiments of mechanisms for and techniques to perform exemplar shopping. The different embodiments of exemplar shopping can utilize a variety of exemplars. For instance, in certain embodiments, the shopping device 102 can include different embodiments of a processor-based portion, a communications interface, and/or a power source. Certain embodiments of the communication interface that can be included in the input/output 611 can include wireless based, contact based, hard-wired based, mechanisms. Certain embodiments of the shopping device 102 can utilize a processor 605 as described in this disclosure to allow shoppers to transfer the exemplar item information and/or shopper input to the shopping control mechanism 106 (at least based in part on interaction between the shopping device and the exemplar). Certain embodiments of the shopping device 102 can utilize modified versions of a variety of technologies to obtain shopper item information and/or shopper input including, but not limited to, information that can be obtained utilizing such media as cameras, camcorders, imaging devices, communication devices, cellular phones, hard-wired based phones, personal display assistants (PDAs), computers (e.g., such as laptops), data transfer devices, etc: Certain embodiments of the shopping device 102 can also be electronic-based or computer-based, and as such can perform on-line shopping such as is known as being provided using ebay, etc.

The use of certain embodiments of the shopping device 102 can also allow for the use of a variety of customers, some of who may not be the ultimate customers. For example, a variety of levels of customers can be allowed in exemplar shopping in a similar manner as a "Tupperware party". As such, certain customers who might be sponsoring such a shopping event may display a variety of exemplars which may be perused by the ultimate customers. As such, various levels or categories of customers, agents, merchants, and/or stores may utilize the exemplar shopping mechanism. and If any of the ultimate customers wish to purchase, or ask additional questions, about the goods, items, or services that are represented by the exemplar, then such customers or ultimate customers may thereupon utilize certain embodiments of the shopping device 102 to ask such questions or queries.

Certain embodiments of the shopping device 102 that can be utilized to shop with one exemplar merchant or store can also be utilized to shop for another exemplar merchant or store. In certain instances, a customer may even enter a first store, and utilize the shopping device to obtain exemplar item information that can be utilized to shop in another store. While such shopping across different stores may be disfavored by certain exemplar merchants or stores, it could be understood how certain embodiments of the exemplar shopping mechanism 100, including certain embodiments of the shopping device 102 and/or certain embodiments of the shopping control mechanism 106 may provide exemplar shopping the considerable commercial advantage in time savings over traditional shopping. As the commercial advantage in time savings becomes more evident and pronounced, certain merchants or stores may be forced to provide certain version(s) of the exemplar shopping.

Certain embodiments of the exemplar 104 could be provided for considerably less than the value of the goods, items, and/or services that the exemplar represents. Such decrease in value of the goods, items, and/or services by the user of exemplars could limit incentives for shoplifting, decrease expenses of acquiring stocked goods or items, and/or diminish expense associated with loss or damage of the exemplar, etc. For example, an exemplar of a can of food similar to as described with respect to FIG. 3 or 4 could include a not-filled version of the can of food, an emptied version of the can of food, a written description of the can of food, an electronic or symbolic description (e.g., including bar code) of the can of food, etc. Similar techniques can be used to reduce the value of exemplars for goods, items, and/or services within packaging, cans, goods, or other items that have a reduced value. Additionally, an exemplar could be physically marked or stamped, such as to indicate that it is not a good, item, or service that is for sale, such as by stating "for display purposes only". The exemplar should clearly represent the goods, items, and/or services that are being offered for sale. Other embodiments of the exemplar could also include a full-value version of the goods or items. In certain embodiments, a single exemplar could be provided to represent the identity of a variety of goods, items, and/or services that may vary, for example, by number of goods or items, color, volume, etc.

In certain embodiments, user(s) or shopper(s) associated with the shopping device 102 can interact with the exemplar 104 to derive the exemplar item information, and in certain instances the shopper input. Within this disclosure, the term "exemplar item information" can include, depending upon context, such information that can be used to identify or recognize at least some goods, items, and/or services that correspond to the exemplar. Within this disclosure, the term "shopper input" can include, depending upon context, that information input from or particular to a particular shopper or customer that can further be used (e.g., beyond the exemplar item information) to identify or recognize particular goods, items, and/or services as being suitable for the shopper. Examples of the shopper input can include, but is not limited to: desired colors, desired sizes, desired styles, etc.

Certain embodiments of the exemplar can be utilized, at least partially using the shopping device 102, to at least partially identify items, goods and/or services that might be of interest to the shopper. For example, the user could capture an image of the exemplar which could represent at least some exemplar item information and/or shopper input, and the image could be transferred (utilizing a communication mechanism), to the shopper control mechanism 106.

As the exemplar is identified (using the shopping device 102 and/or the shopping control mechanism) as corresponding to, representing, or indicating one or more goods, items, and/or services, then the identified or recognized goods, items, and/or services could be indicated to the customer or shopper. Alternately the goods, items, or service corresponding to the exemplars can be recognized and/or identified using software, hardware, and/or firmware situated either at the shopper control mechanism 106 and/or at the shopping device 102. Certain goods, items, and/or services might or might not be in stock and/or made available at the exemplar merchant or store, and therefore may have to be ordered from some remote location, or even from a manufacturer, retailer, or other exemplar-based or traditional merchant or store. For instance, those goods, items, and/or services that are indicated as being represented by the exemplar could be provided either in image, text, or other descriptive manner on the shopping device 102 and/or the shopper control mechanism 106. Different embodiments of the shopping control mechanism 106 and/or the shopping device 102 could utilize a subjective, objective, weighted, adjustable, or other comparative recognition or identification standard, depending upon context. The user could also provide such particular shopper input to enhance the recognition process including various such user options as: whether they wish to purchase the goods, items, and/or services, whether they wish to price the goods, items, and/or services, whether the goods, items, and/or services is available for purchase by the particular vendor, retailer, or manufacturer, comparative costs at other locations, etc. The shopper could also provide a suitable shopping query to assist in the recognition process.

Certain embodiments of the shopping device 102 (and also perhaps the shopper control mechanism 106) can be utilized to store the exemplar item information and/or the shopper input relating to staple goods, items, and/or services. Consider that a particular shopper who frequents a particular merchant or store may often purchase similar goods, items, and/or services from similar manufacturers, vendors, retailers, or producers. For example, a typical shopper at a particular grocery store may often buy a particular type of milk, eggs, paper products, etc. during each visit, or many of the visits. It may be desirable to configure the shopping device 102 and/or the shopping control mechanism 106 such that certain goods, items, and/or services can be ordered without the customer having to go to a physical exemplar, but perhaps by referring to a buying description or shopping history of the goods, items, and/or services. In certain embodiments, such buying description could include at least a portion of the information included as the exemplar item information and/or shopper input. In certain embodiments, the shopping history can represent exemplar item information and/or shopper input obtained during a prior buying trip to the same or a different merchant or store. Certain embodiments of the exemplar item information and/or shopper input can be easily accessed utilizing a variety of graphical user interfaces (GUI) and/or selection buttons, as is generally understood in the computer field and the electronics field. With certain embodiments of the shopping device 102, such exemplar item information and/or shopper input relating to such frequently purchased goods, items, and/or services may be maintained as data in some desired location (e.g., in the shopping device 102 and/or the control mechanism 106) as a result of the shopper previously dealing with exemplars.

As such, perhaps the shopper or customer could select goods, items, and/or services corresponding to the particular exemplar that has been identified and/or recognized using certain embodiments of the exemplar shopping mechanism 100 during a prior visit, without having to physically interface with the particular exemplar again. Certain embodiments of the shopping device 102 can thereby maintain histories of the exemplar item information and/or the shopper input, which could be accessed during subsequent shopping either at the location of the exemplar merchant and/or store, or at some remote location. As such, certain embodiments of this shopping device 102 can interact with certain embodiments of the shopping control mechanism 106 to limit the number of shopping trips certain customers may have to make to physically to the exemplar merchant and/or store. Within this disclosure, certain such remote shopping trips can be, depending upon context, be considered as exemplar shopping. In certain embodiments, the exemplar item information and/or shopper input may thereupon be able to be recalled by the shopper, personnel, or agent of the exemplar merchant or store upon demand.

Certain customers may not have to travel to the exemplar merchant store for each shopping excursion, but instead could purchase goods, items, and/or services remotely or otherwise at least partially using the exemplar item information and/or shopper input derived from the customer's previous history (which could be stored in certain embodiments of the shopper device). Certain customers can limit shopping trips to those instances where they are purchasing different items that they have not purchased from the exemplar merchant and/or store. Instead of the customer having to run around the physical store to locate interface with the exemplars, certain embodiments of goods, items, or services can also be shopped for utilizing exemplar shopping techniques based at least on previously-derived exemplar item information and/or shopper input. In certain embodiments, the previously-derived exemplar item information and/or shopper input can thereby act as, and be considered as, exemplars.

Certain embodiments of shopping device 102 can thereby include reference for frequently purchased, difficult to find, and/or other selected goods, items, and/or services. In certain embodiments, the shopping device that interact with the shopper control mechanism 106 to, for example, provide current pricing information, exemplar or item locations, and/or other shopping information which might be useful to shoppers or customers. In certain instances, such shopping can be performed remotely or otherwise at least partially using the exemplar, and even remotely from the exemplar merchant and/or store.

Certain residents of remote locations that are a considerable number of miles away from any particular store could shop with a remote exemplar merchant or store or merchant based at least in part on their prior exemplar history (including the exemplar item information and/or the shopper input), and have at least certain ones of their goods or items delivered either by mail or by a delivery person. In other instances, handicapped individuals or others that may have difficulty traveling to traditional stores might use exemplar merchants or stores for shopping. In certain instances, exemplar shopping may save a considerable amount of time since the customer or shopper may not have to travel to the store. It might be more desirable to have their goods delivered by a delivery person or mail to save time, and reduce repetitive shopping trips. Instead of certain shoppers having to order large numbers of items for an extended duration (e.g., the weekly shopping trip), certain shopper's may feel that they find exemplar shopping to be less time-obtrusive such that they can shop quickly for a meal, etc. As such, certain exemplar shoppers may prefer to shop for briefer durations than might be the case for traditional shopping. In addition, exemplar shopping can be used to resupply or restock goods, items, and/or services at the location where the goods, items, and/or services are to be provided (e.g., in the kitchen).

The exemplar merchants of stores being able to offer such services to such customers in remote locations, disable, or even just as a convenience may provide a competitive advantage for the exemplar merchant and/or store. A considerable number of customers may also feel allegiance to such exemplar merchants or stores.

Certain embodiments of the exemplar shopping can be provided by on-line exemplar merchants or stores, such that the shoppers could transmit the exemplar item information and/or the shopper input to an electronic exemplar merchant or store using email, or by another transmission technique. Certain embodiments of the electronic exemplar merchant or store could thereby provide to their customers the ability to recognize the manufacturers, distributors, etc. of the goods, items, and/or services that correspond directly, or closely, to the exemplar as provided by the customer or shopper.

In this disclosure, certain embodiments of the exemplars are intended to describe goods, items, and/or services that can act as exemplars, models, goods, items, and/or services that could be purchased. Certain embodiments of the exemplars can be configured to provide for electronic-based, audio-based, image-based, or similarly-based interaction between the shoppers or users at least partially with the exemplars. Such interaction can be used to identify the goods, items, and/or services represented by the exemplars.

A variety of scenarios in this disclosure describe using certain embodiments of the exemplars for shopping. Certain embodiments of the exemplar merchant and/or store could be provided by which shoppers can view exemplars corresponding to particular goods, items, and/or services to be purchased. Consider, for example, that a variety of exemplar merchants and/or stores (e.g., a grocery merchant or store, a clothing merchant or store, a goods merchant or store, a hardware merchant or store, and/or a convenience merchant or store) could be provided that contains at least some exemplars representing goods, items, and/or services. Certain exemplar merchants and/or stores could entirely deal with exemplars in selling, considering selling, or offering for sale their goods, items, and/or services, or alternately could utilize any intermediate percentage of exemplars in selling, considering selling, or offering for sale their goods, items, and/or services.

Certain shoppers or consumers may be less likely to purchase certain types or classes of items, goods, or services using exemplars (or exemplar shopping techniques) as compared to other types of items, goods, or services. For example, in certain merchants, stores, manufacturers, or retailers such as a grocery store, certain shoppers could confidently purchase such consistent-quality or non-spoilable items or goods, long-lasting bulk items or goods, and/or packaged items or goods such as but not limited to: canned items, toiletries, cleaners, alcohol, etc. Certain exemplars that represent long-lasting items could reflect the goods or items which are being considered for purchasing, considering selling, considering selling, offering for sale, purchasing, evaluating goods or items, pricing, or shopping. By comparison, certain shoppers would be prudent to exercise care when shopping for such variable, limited-life, or spoilable items or goods as meats, vegetables, flowers, etc. using exemplars in which the condition or state of the exemplar could vary considerably between the exemplar and the actual goods, items, and/or services to be purchased. As such, certain merchants or stores may utilize both exemplar-shopping and traditional-shopping techniques in distinct portions thereof, or for particular products, goods, and/or services. Within this disclosure, the term "traditional" when relating to exemplar merchants and/or stores are meant to include merchants or stores that do not rely on any exemplar shopping techniques and/or exemplars, or do not rely on exemplar shopping techniques and/or exemplars for particular goods. Certain embodiments of the exemplar merchant or store could be configured as desired or designed to simply balance traditional shopping techniques with exemplar shopping techniques. As such, it may be advantageous for exemplar merchants or stores to "experiment" with a variety of exemplar shopping experiments, and select the most appropriate depending upon the types, value, location, access, etc. of the goods, items, and/or services; as well as a variety of customer or shopper considerations.

Certain embodiments of exemplar shopping can utilize, for example, the shopping device 102 identifying or recognizing an exemplar that represents other goods, items, and/or services which can be purchased. Certain embodiments of such identifying the object can utilize capturing an image (e.g., taking a digital, still, motion, or other suitable picture) of the exemplar that corresponds to the items, goods, or services.

The various embodiments of using an exemplar to shop for particular goods, items, and/or services, as described in this disclosure, are not intended to be limiting in scope. Such shopping concepts can also be applied to considering purchase of any suitable goods, items, and/or services which can be characteristically identified. For example, consider an instance where a shopper sees goods, services, and/or an item such as clothing that he/she likes (e.g., being worn, e.g., by a model or another person) as described with respect to FIG. 2. Once an exemplar has been found, this disclosure describes a number of exemplar shopping mechanisms by which one or more exemplar merchants and/or stores could be queried as to whether they can identify or recognize one or more goods, items, and/or services (which they could have stocked and/or could obtain such as by ordering from a manufacturer, distributor, etc.) that correspond to the exemplar. In certain embodiments, a person associated with any particular exemplar could be a store model, or just an individual wearing the goods, items, and/or services such as clothes being sold, retailed, obtainable, or manufactured by that exemplar merchant and/or store. In other embodiments, the exemplars could be worn and/or used by another person in a variety of locations such as in the office, on the street, with a merchant, in a store, in the workplace, and sporting events, and an awards ceremony, outside, and/or at some other location. As such, certain embodiments of exemplars represent goods, items, and/or services that might be in common usage even if they have been used or worn for some time, as well as brand-new goods, items, and/or services. Certain embodiments of the shopping device 102 as described with respect to FIGS. 1 to 3 could likely be used in a number of distinct merchants, stores, retailers, manufacturers, etc. (e.g., perhaps each exemplar merchant and/or store contacted can be associated with a particular code, or alternately could be associated with only a single merchant, store, vendor, manufacturer, etc.).

In certain embodiments, the shopper can recognize or identify the goods, items, and/or services by, for example, capturing an image of the goods, items, or service (e.g., a shirt) and forwarding the image to a retailer, merchant, store, vendor, or manufacturer that could carry identical or similar goods, items, and/or services. Certain embodiments of the shopping device 102 could thereby utilize technology similar to cameras, photographic cell phones, PDAs, etc. to capture images and transfer them to the merchant, store, retailer, manufacturer, etc. In certain embodiments, the forwarding of the captured image can include electronically transferring one or more images corresponding to the exemplar to a retailer or manufacturer, (e.g., using e-mail, data transfer, or other similar mechanisms) who would likely sell those goods, items, and/or services. Other similar audio, image, voice, electromagnetic, and/or vibrational techniques may be used to query exemplar merchants and/or stores to recognize and/or identify the goods, items, and/or services, and whether the exemplar merchants and/or stores could provide such exemplar goods, items, and/or services.

In certain embodiments, the exemplars could be worn or used by store models (either on the store premises or remotely situated) who might be associated with a particular store, merchant, retail location, or manufacturer, in which instance the source of the goods, items, and/or services might be easy to establish. For example, a model might be recognized as being a model who is associated with a particular merchant, store, manufacturer, and/or vendor (e.g., Macy's), because of their location, the goods, items, and/or services by their associated with, or some other indicator such as a sign. The model might be standing relative to a sign indicating, or saying verbally, that certain things that the model(s) are wearing and/or using is available at a particular merchant, store, vendor, manufacturer, and/or location. Using certain embodiments of the shopping device 102 and/or the shopping control mechanism 106 as described in this disclosure, the shopper or user could shop for such goods, items, and/or services in a location remote from a physical or electronic version of the merchant, store, vendor, retailer, manufacturer, etc.

Using the exemplar techniques as described herein, the potential buyer could capture exemplar item information such as one or more images associated with the particular goods, items, and/or services that can be provided as exemplars, an electronic record of the particular exemplar goods, items, and/or services, and or audio associated with the particular exemplar goods, items, and/or services, and communicate such exemplar item information (either alone or with additional shopper input from the potential buyer to further identify the desired goods, items, and/or services such as manufacturer, color, sizes, etc.) to the merchant, store, retailer, or manufacturer.

While certain of the exemplar techniques are described relative to particular types of items, goods, and/or services (e.g., clothes, groceries, etc.), it is to be understood that such particular types of items, goods, and/or services are intended to be illustrative in nature, and not limiting scope. Certain ones of the techniques as described in this disclosure are intended to be applicable to shopping utilizing exemplars in general, regardless of the particular types of goods, items, and/or services that might be offered for sale utilizing exemplar techniques.

The use of exemplars could allow certain manufacturers to more easily sell their own goods, without the use of middlemen, retailers, etc. in such a manner as which could provide a cost benefit to the consumer. For example, certain embodiments of traditional stores such as traditional retail stores, traditional grocery stores, etc. might be associated with only those manufacturers or distributors that can stock or display goods, items, and/or services in large numbers. By comparison, certain embodiments of exemplar merchants and/or stores could be associated with a relatively larger number of manufacturers, distributors, goods, items, and/or services that they can carry as exemplars and/or by ordering when purchased by a customer. By allowing manufacturers to more directly interface with customers, more customers can thereby determine and indicate what they actually want, instead of having to rely on goods, items, and/or services (e.g., traditionally large-volume) that are most commonly provided by retailers, distributors, vendors, middleman, etc. Additionally, certain embodiments of exemplars can provide an inexpensive technique to evaluate sales for experimental, uncertain, or other goods, items, and/or services that otherwise might have outlets for being offered for sale. Additionally, exemplars allow such goods, items, and/or services could be offered for sale in an inexpensive or trial basis in unusual circumstances or locations.

Certain embodiments of exemplar shopping, such as could be provided by exemplar merchants and/or stores, can be a great boon for producers, manufacturers, or distributors for commercially of marginal or experimental goods, items, and/or services. As such, exemplar merchants and/or stores can provide opportunities for such producers, manufacturers, or distributors for commercially of marginal or experimental goods, items, and/or services to obtain shelf space (whether real, virtual, or by order only) in such exemplar merchants and/or stores. This can also allow users or customers to buy goods, items, and/or services from producers, manufacturers, or distributors without the need for actual stocking of the goods, items, and/or services. Certain embodiments of the exemplar merchants and/or stores can thereby also offer a class of "also available" goods, items, and/or services that consumers can buy on the spot, but may take longer to obtain (such time may be necessary to order the goods, items, and/or services, and/or provide time to obtain from the manufacturer, etc.).

Certain embodiments of the exemplar merchant and/or stores can present a comparatively wide variety of goods, items, and/or services based on context or as cross promotions. For example, a high-end electronics boutique might stock goods or items without devoting any shelf space to supplies for the goods and/or items, such as not including associated batteries, cartridges, or other items that are associated with particular goods or items. Some of the associated goods, items, and/or services may even be necessary for use of the goods, items, and/or services. As such, in certain instances, exemplar merchant and/or store shoppers could purchase the primary goods, items, and/or services and put it in their cart, and thereupon are then offered a choice of these associated goods, items, and/or services which they could buy on the spot, possibly as a discounted price to buy as a bundle. In certain instances, the associated goods, items, and/or services can be delivered from the vendor, manufacturer, retailer, etc. in a manner that may arrive in hours, or days, at their house. Further examples of delivery aspects for goods, items, and/or services are described in this disclosure.

In certain embodiments, the shopper can also transmit exemplar item information, such as desired object identity, size, color, manufacturer, or other identifiers of the goods, items, and/or services that are desired to be purchased (e.g., such as to the shopping control mechanism). As such, depending upon the intent of the purchaser, certain embodiments of the exemplar, may represent a general type of goods, items, and/or services be purchased (e.g., a green T-shirt). Alternately, such exemplars could represent a more specific example of the goods, items, and/or services that could be purchased (e.g., a specific color, style, pattern, manufacturer, of such goods, items, and/or services as clothing, etc.). As such, exemplars can vary considerably in specificity.

Certain embodiments of capturing an image of (or other information relating to) the exemplar could be considered as equating to one embodiment of a query. In certain embodiments, the shopper can receive a response to the transmitted image and associated information (which might correspond to the exemplar item information and/or the shopper input) to the merchant, store, retailer, or manufacturer. In effect, the merchant, store, retailer, manufacturer, etc. (either an electronic or physical version) can be queried by the customer as to whether they are selling, considering selling, offering for sale, or could otherwise provide or order particular goods, items, and/or services. Certain embodiments of the manufacturer or retailer can respond appropriately to the query. Examples of such query responses might include, but are not limited to: indicating that the exemplar merchant or store does or does not have the style of the shirt that the shopper is looking for, indicating that the exemplar merchant or store could obtain or order such goods, items, and/or services, and/or indicating that the exemplar merchant or store can even provide additional information such as additional goods, items, and/or services or accessories that might be purchased with the goods, items, and/or services using the exemplar.

In certain instances, the exemplar shopping mechanism 100 might be able to provide approximate information pertaining to the goods, items, and/or services to be purchased to the shopper, in which case the shopper can be queried by the exemplar merchant and/or store as to uncertainties in the order, etc. Certain embodiments of the shopping device 102 and/or the shopping control mechanism 106 can even utilize approximate recognition, fuzzy logic, or other logical systems to potentially improve the recognition or identification characteristics of the exemplar shopping mechanism. For example, if the shopping device 102 captures an image of the exemplar's image and/or provided description such as might include the exemplar item information, as an ordinary-appearing green shirt, then the manufacturer or retailer may submit a list of manufacturers who makes a similar-appearing shirt (and perhaps in certain embodiments an image of the goods from each manufacturer). The shopper or customer can thereupon select one, several, or none of the goods.

Figure 2:
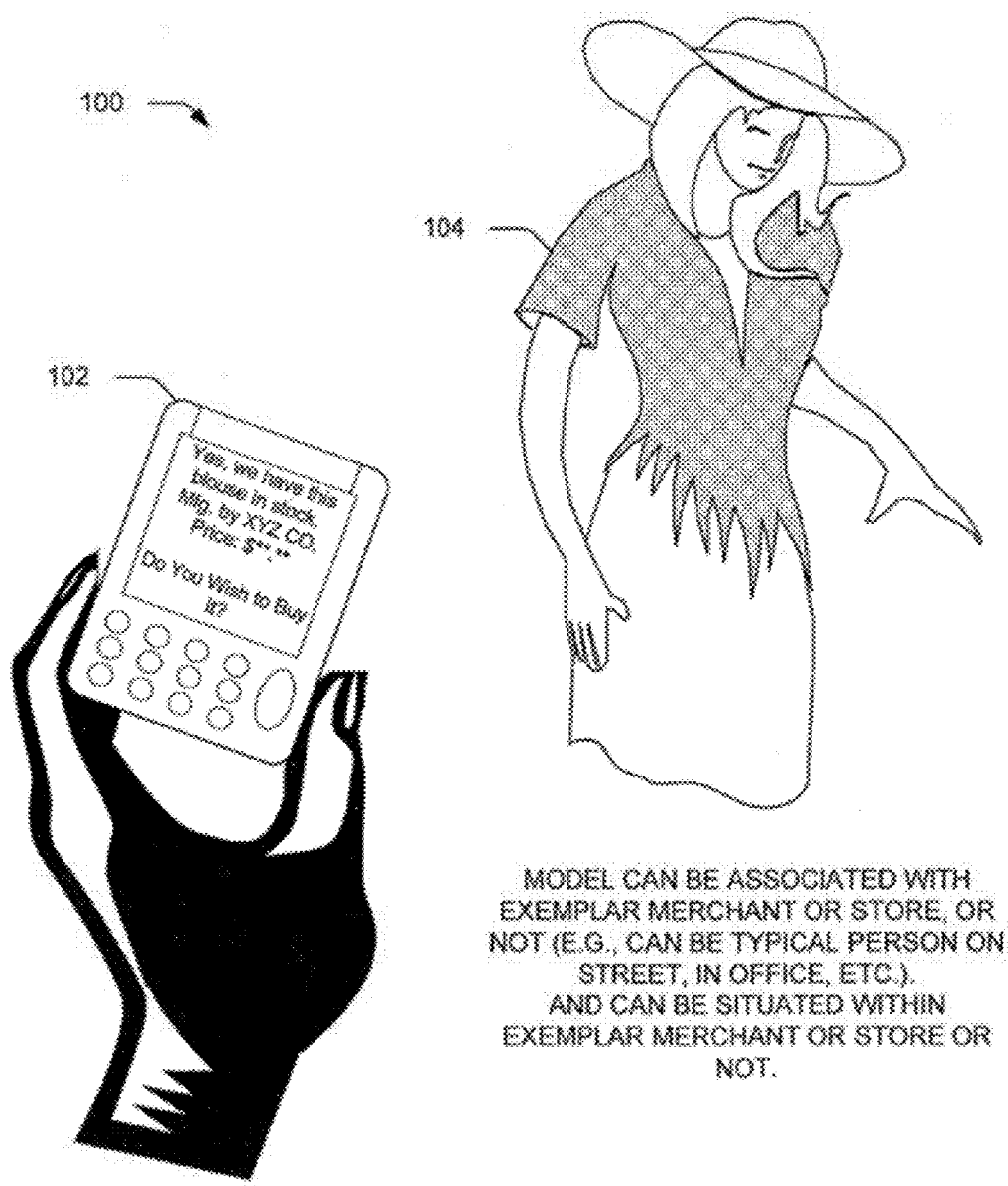
FIG. 2 is a diagram of one embodiment of the shopping device of the exemplar shopping mechanism.
Figure 3:
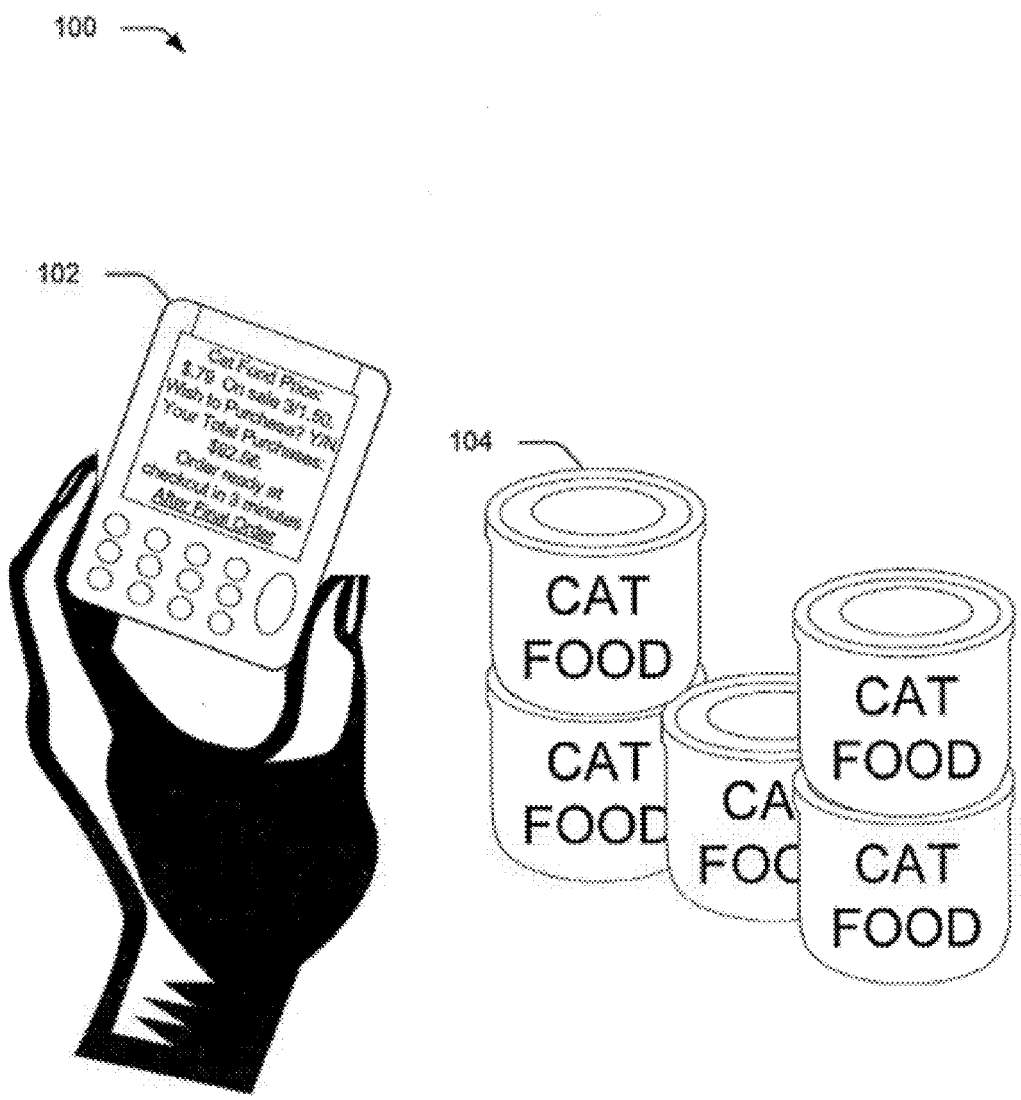
FIG. 3 is a diagram of another embodiment of the shopping device of the exemplar shopping mechanism.

While FIGS. 2 and 3 illustrate two embodiments of the exemplar shopping mechanism 100 that can utilize a variety of technologies to allow the shopping device 102 to identify or recognize those particular goods, items, and/or services that correspond to particular exemplars. In the FIGS. 2 and 3 embodiments, the shopping device 102 utilizes the exemplar item information and/or the shopper input to identify or recognize those goods, items, and/or services that corresponds to particular exemplars.

Figure 4:
FIG. 4 is a diagram of an embodiment of the shopping device and the exemplar of the exemplar shopping mechanism.

FIG. 4 illustrates another embodiment of the exemplar shopping mechanism in which this functionality of the shopping device 102 can be at least partially applied to the exemplar 104, as well as the shopping device 102. For example, the embodiment of the shopping device 102 of FIG. 4 can include a personal identification card portion 402 and an exemplar reader portion 40. In the FIG. 4, embodiment, the exemplar item information and/or the shopper input can be at least partially derived using the exemplar reader portion 404 based at least in part on personal identification provided by the personal identification card portion 402 to the exemplar reader portion 404.

Certain embodiments of the personal identification card portion 402 can be structured to provide personal identification as associated with a particular shopper in a similar manner as a credit card, debit card, a so-called "smart-card", or other store-based or bank-based identification card or mechanism as described with respect to FIG. 4. For example, certain embodiments of the personal identification card portion 402 can include a magnetic strip, a radio frequency identifier (RFID), an optical data-storage identifier mechanism, and electromagnetic data-storage identifier mechanism, or the other data storage identifier mechanism that can be utilized to the contain the personal identification as associated with a particular shopper. The security aspects associated with the personal identification card portion 402 can vary considerably. Certain merchants, stores, manufacturers, etc. may equate reading of the personal identification card portion 402 by the exemplar reader portion 404 resulting from the customer or shopper providing their card and/or authenticating the transaction to purchasing the goods, items, and/or services. By comparison, other merchants, stores, manufacturers, etc. may equate reading of the personal identification card portion 402 by the exemplar reader portion 404 with selling, considering selling, offering for sale, shopping, or only considering purchasing. As such, the particular merchant, store, manufacturer, etc. may set their security standards for a particular personal identification card portion 402 based at least in part on the particular action performed by the shopper, the customer, the practice or customs of the store, etc.

The operability of the personal identification card portion 402 between different merchants, vendors, stores, manufacturers, etc. can also vary considerably. For example, certain embodiments of the personal identification card portion 402 can be only applicable between the customer and the particular merchant or store. By comparison, other embodiments of the personal identification card portion 402 can be applicable between the customer and a number of merchants are stores. If certain embodiments of the personal identification card portion 402 of the shopping device 102 become as ubiquitous as, say, credit cards; then many of the distribution, selling, offering for sale, or other divisions between different merchants or stores within malls, cities, etc. may reduce considerably. As such, certain users could use their personal identification card portion to shop in a variety of different exemplar merchants and/or stores as well as traditional merchants or stores. Using certain embodiments of the exemplar shopping techniques as described in this disclosure, the customers may seamlessly transition between adjacent or multiple stores in the same vicinity (e.g., for mall or town stores) such as to perhaps not have to encounter the check-out of each item at which they are shopping.

Figure 5:
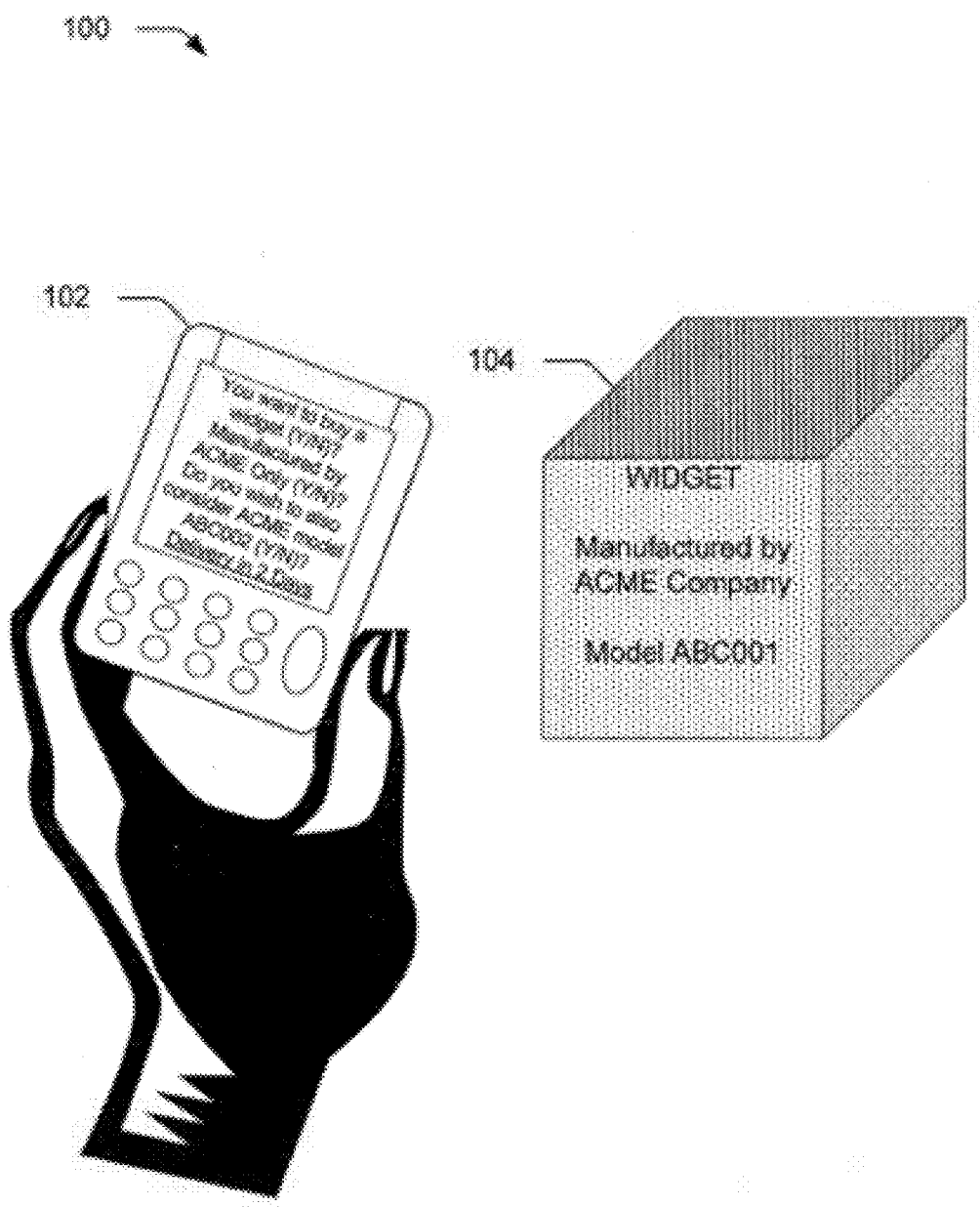
FIG. 5 is a diagram of yet another embodiment of the shopping device and the exemplar of the exemplar shopping mechanism.

FIG. 5 shows another embodiment of exemplar shopping, in which the customer, using certain embodiments of the shopping device 102, can shop for an item of unknown sales location. For example, consider that the shopper encounters certain goods, items, or services that might be offered for sale at some indoor, outdoors, or other location. In this disclosure, the term widget is intended to relate to any manufactured goods, items, and/or services. The widget itself may contain some identification, such as the manufacturer, which could be accessed utilizing the shopping device to allow a variety of exemplar shopping experiences. For example, the electronic connection could be established between the shopping device 102 and the shopping control mechanism 106 as described with respect to FIG. 1 utilizing the Internet or other suitable security and/or communication techniques and/or devices. Thereupon, in certain embodiments, the customer could communicate with the exemplar merchant or store, retailer, middle-person, manufacturer, seller-agent and/or any other individual or entity that could provide or sell the goods, items, and/or services.

Figure 8:
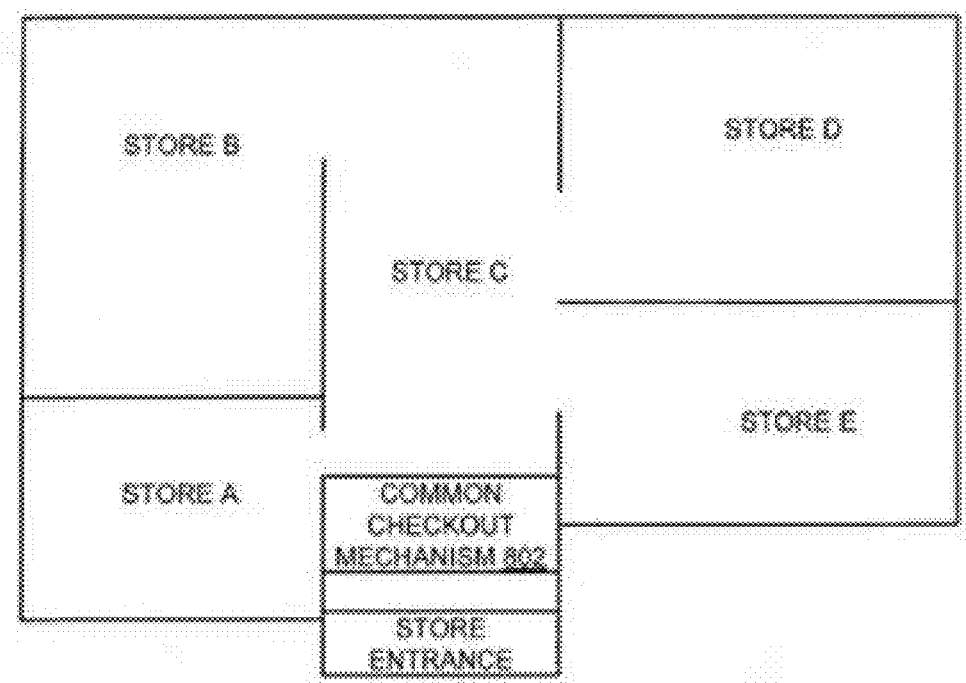
FIG. 8 shows a floor plan of one embodiment of exemplar store including a common checkout mechanism.

FIG. 8 shows an embodiment of multiple ones of the exemplar merchant and/or store utilizing a common checkout mechanism 802. Such common checkout mechanisms 802 can utilize a variety of the shopping control mechanism 106 as described in this disclosure. Certain embodiments of the shopping control mechanism 106 that can be utilized within the common checkout mechanism 802 can segment goods, items, and/or services obtained from different exemplar merchants or stores. For example, a customer or shopper within a mall may peruse several exemplar merchants or stores, and shop to purchase a number of goods, items, and/or services from different ones of the exemplar merchants or stores. Such results from the exemplar shopping may vary, for example, from the customers carrying the physical exemplar to the common checkout mechanism 802 to the shopping device 102 (and common security aspects and/or devices associated therewith) being utilized in different stores, and collecting a variety of exemplar item information and/or shopper input (which may be considered as the exemplar) that may be thereupon provided at the common checkout mechanism 802.

One aspect of the exemplar merchant or store utilizing the common checkout mechanism 802 is that in certain embodiments, the floor space of the store can be used more efficiently. For example, traditional malls or stores can be redesigned such that exemplar merchants or stores can be situated where lobbies, walkways, or at other common locations. In certain embodiments, the common checkout mechanism 802 can be situated at the common egress for the store, in security for all the stores can focus on the common checkout mechanism location 802. Instead of shoppers having to walk distances from store to store through the common areas of traditional stores, certain embodiments of the exemplar merchants or stores that utilize the common checkout mechanism 802 can be configured to allow placement of additional stores within the common areas and spaces that can share the security aspects of the other stores that are situated in their devoted spaces.

As such, in many instances, exemplar merchants and stores can be designed based on efficiently, securely, and pleasingly providing, the goods, items, and/or services to their customers. Instead of multiple stores within the traditional mall and other traditional multiple store configurations each being configured to common e.g., carry similar goods; multiple stores in the exemplar merchant or store configuration can provide store configurations most suited to shopping. For example, as described with respect to FIG. 8, the different exemplar merchants or stores may be configured not so much on who operates them (store owner, retailer, etc.), but may be more designed based on types of goods, items, and services that can be shopped for at that location.

As such, certain embodiments of the shopping device 102 and/or the common checkout mechanism 802 can interface to allow the shoppers to visit only one check-out for multiple stores could thereby provide to the customer a substantially seamless shopping experience. For example, if the customer shops at multiple stores within a single mall, it might be expected that the goods, items, and/or services obtained from different stores during the shopping trip could be delivered together. As such, it could be understood that the delivery or sequencing of goods, items, and/or services could be shared between multiple stores within the same mall. Fewer stores could thereby have the inconvenience and added expense and/or space of maintaining distribution staffs, and such distribution operations could be performed, perhaps more efficiently, by fewer shared-distribution people and/or equipment across a number of merchants or stores. Alternately, more stores could provide delivery of their goods and/or services using the delivery of, for example, the mall, another store, a number of stores, some third party, etc.

With certain embodiments of exemplar shopping, the checkout itself may not be necessary. For example, consider that a shopper may actually utilize certain embodiments of their shopping device 102 to purchase the goods, items, and/or services 108 electronically using a variety of interactions with the shopping control mechanism 106 as described with respect to FIG. 1. In certain instances, such interactions between the shopping device 102, the exemplar 104, and/or the shopping control mechanism 106 can utilize a variety of the point-of-sale technologies or techniques such that the customer actually buys the goods, items, and/or services at the point of contact. Thereupon, depending upon the delivery techniques, the shopper or customer could exit the domain of the exemplar merchant or store while bypassing the checkout.

Certain embodiments of the exemplar reader portion 404 of the shopping device 102 can be configured to recognize whether a particular customer, being associated with the personal identification card portion 402, would like to purchase, consider purchasing, and/or offer to purchase particular goods, items, and/or services. Certain embodiments of the exemplar reader portion 404 can also determine in certain embodiments whether the particular customer is authorized to perform such selling, considering selling, offering for sale, purchasing, or considering purchasing actions. Certain embodiments of the exemplar reader portion 404 will thereupon communicate with the shopping control mechanism 106, and indicate the pertinent exemplar item information and/or shopper input to the shopping control mechanism.

There can be a number of configurations of the exemplar reader portion 404 that can include, but are not limited to, being attached to the exemplar 104, being secured to the table or shelves in the neighborhood of the exemplar, being provided to customers as they enter the store, etc. Certain embodiments of the exemplar reader portion 404 can be associated with a number of types of goods, items, and/or services, or alternatively a single type of goods, items, and/or services. Certain embodiments of the exemplar reader portion 404 of the shopping device 102 can even be physically attached to the exemplar 104. With such embodiments, it is likely that the user could associate their personal identification card portion 402 of the exemplar reader portion 404, and may be unsure as to which exemplar is being purchased, or being considered for purchasing. In those instances where the exemplar reader portion 404 is associated with the number of goods, items, and/or services: some mechanism must be provided to indicate which goods, items, and/or services are being purchased, offered to be purchased, considered for purchasing, priced, queried, etc. at any given time.

Much of the recognition, identification, and other operations associated with the embodiments of the shopping device 102 as described with respect to FIGS. 2 and 3 can be performed by the embodiment of the shopping device as described with respect to FIG. 4 by the personal identification reader portion 404. Certain embodiments of the shopping device 102 are owned by and/or under the control of the shopper. Certain embodiments of the personal identification reader portion 404 of the shopping control mechanism 106 are owned by and/or are under the control of the store. The merchants and store operators can consider which embodiment of the shopping device 102 are most desirable, and/or suit their or their customer's needs. Certain embodiments of the shopping device 102, as described in this disclosure with respect to FIGS. 1-4, can be configured to transfer the exemplar item information and/or the shopper input to the particular embodiment of the shopping control mechanism 106. Certain embodiments of the exemplar item information and/or the shopper input can thereby indicate to the merchant or store those items that the customer may wish to purchase, offer to purchase, consider purchasing, priced, and/or perform some other shopping-related operation.

Certain embodiments of such shopping using captured images of the exemplars can be performed within a retail center, outside, within the building, within an office, within a restaurant, within a home, etc. Shopping by certain embodiments of imaged exemplars can limit the time, expense, effort associated with shopping. For example, instead of having to travel to a particular location associated with the merchant, store, shopping center, mall, or city store, the shopper can capture an image of goods, items, and/or services to be purchased, and thereupon forward such goods, items, and/or services electronically.

Figure 6:
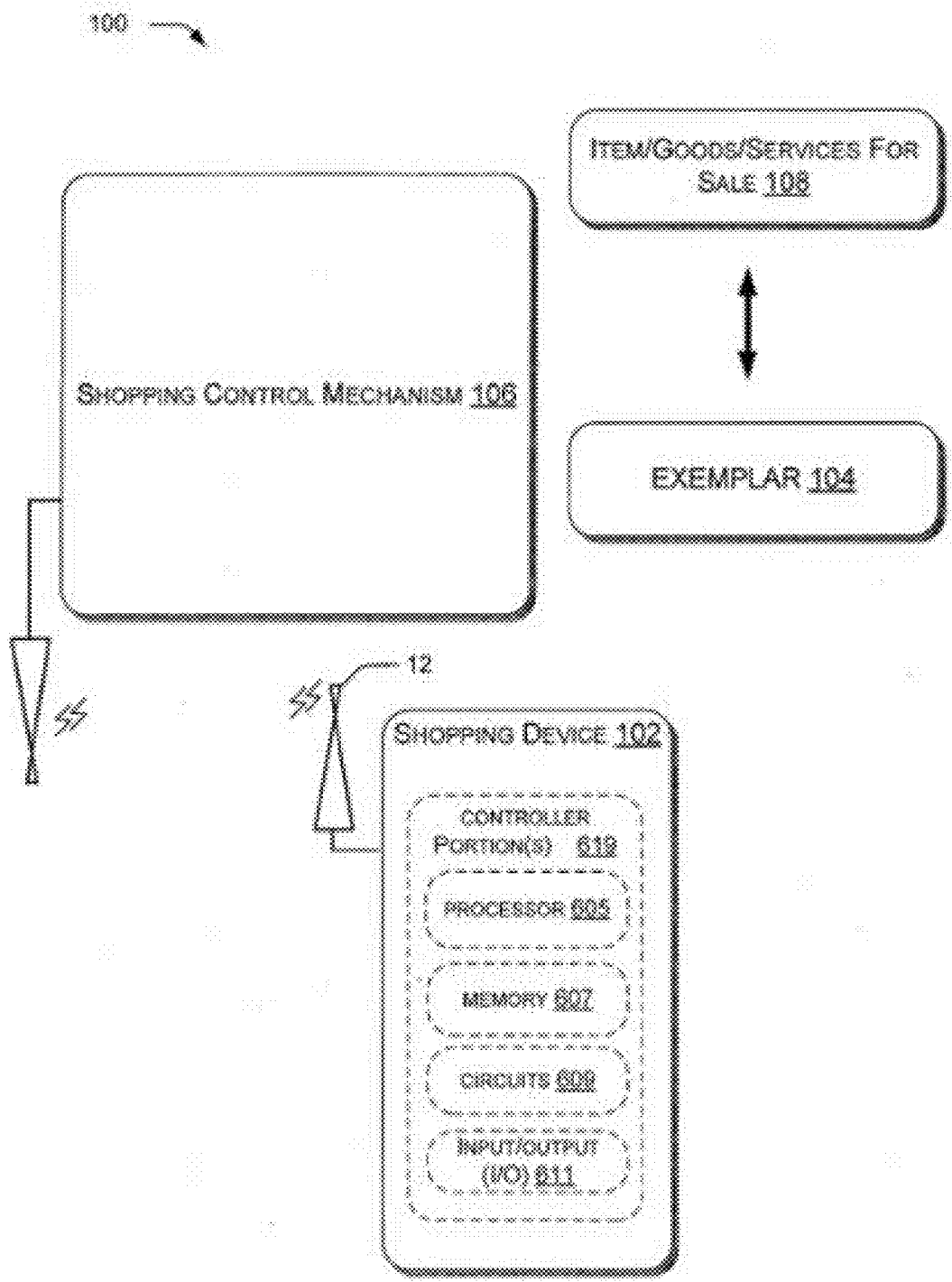
FIG. 6 is a block diagram of another more detailed embodiment of an exemplar shopping mechanism, being utilized for shopping.

Another description of certain embodiments of the exemplar shopping mechanism 100 is now described with respect to FIG. 6. FIG. 6 shows an embodiment of the exemplar shopping mechanism that can include the shopping device 102 and the shopping control mechanism 106, in addition to the exemplar 104. Certain embodiments of the shopping device 102 can include or be computer-based, mote-based, and/or electronics based. As such, this disclosure describes a number of components of the shopping device 102 that can operate utilizing computer-based technology. As described within this disclosure, multiple ones of the different embodiments of the shopping device 102 (e.g., the controller portion 619) can transfer image information, one or more portions of images, other information, etc. to each other via a communication link to or from the shopping control mechanism 106. Certain embodiments of the controller portion 619 of the shopping device 102 can include a processor 605 such as a central processing unit (CPU), a memory 607, a circuit or circuit portion 609, and an input output interface (I/O) 611 that may include a bus (not shown). Different embodiments of the controller portion 619 of the shopping device 102 can include a general-purpose computer, a specific-purpose computer, a microprocessor, a microcontroller, a personal display assistant (PDA), a cellular phone, a wireless communication device, a hard-wired phone, and/or any other known suitable type of communications device, computer, and/or controller that can be implemented in hardware, software, electromechanical devices, and/or firmware. Certain portions of the controller portion 619 of the shopping device 102 can be physically or operably configurable in each controller portion 619 of the shopping device 102 as described with respect to FIGS. 1 to 4. In certain embodiments, the processor 605 as described with respect to FIG. 6 can perform the processing and arithmetic operations for certain embodiments of the controller portion 619 of the shopping device 102. Certain embodiments of the controller portion 619 of the shopping device 102 can control the signal processing, database querying and response, computational, timing, data transfer, and other processes associated with certain embodiments of the controller portion 619 of the shopping device 102. In certain embodiments, one version of certain embodiments of the controller portion 619 of the shopping device 102, as described with respect to FIG. 6, could be configured to transfer the exemplar item information and/or the shopper input between certain embodiments of the shopping device 102 and certain embodiments of the shopping control mechanism 106.

Certain embodiments of the memory 607 can include random access memory (RAM) and/or read only memory (ROM) that together store the computer programs, operands, and other parameters that control the operation of certain embodiments of the controller portion 619 of the shopping device 102. The memory 607 can be configurable to contain the exemplar item information, shopper input, and other such information obtained, retained, or captured by that particular controller portion 619 of the shopping device 102.

Certain embodiments of the bus can be configured to provide for digital information transmissions between the processor 605, circuits 609, memory 607, I/O 611, and/or a removable of integrated image storage device. In this disclosure, the memory 607 can be configurable as RAM, flash memory, semiconductor-based memory, of any other type of memory that is configurable to store data pertaining to images. The bus also connects I/O 611 to the portions of certain embodiments of the controller portion 619 of the shopping device 102 that either receive digital information from, or transmit digital information to certain embodiments of the shopping control mechanism 106, and other or intermediate portions of the exemplar shopping mechanism 100.

Certain embodiments of the controller portion 619 of the shopping device 102 as described with respect to FIG. 6 can include a transmitter portion (not shown) that can be either included as a portion of certain embodiments of the controller portion 619 of the shopping device 102, or alternately can be provided as a separate unit. Certain embodiments of the controller portion 619 can be, e.g., microprocessor-based. In certain embodiments, the transmitter portion can transmit image information between certain embodiments of the controller portion 619 of the shopping device 102 and the shopping control mechanism 106 over wired and/or wireless communication links.

Certain embodiments of the controller portion 619 of the shopping device 102 as described with respect to FIG. 6 includes an operation altering portion (not shown) that can be either included as a portion of certain embodiments of the controller portion 619 of the shopping device 102, or alternately can be provided as a separate unit (e.g., microprocessor-based). Examples of operation altering portions include, but are not limited to, altering a resolution, altering a contextual library, altering an aspect ratio, altering a color intensity and/or brightness or particular shopping devices.

The memory 607 can provide one example of a memory storage portion. In certain embodiments, the monitored value includes, but is not limited to: a percentage of the memory 607, a number of images that are stored in the memory 607, or for motion images a recording interval (audio or video recording intervals).

To provide for overflow ability for the memory 607 of certain embodiments of the controller portion 619 of the shopping device 102, the image storage device can be operably coupled to the memory 607 to allow a controllable transmitting of memory data from certain embodiments of the controller portion 619 of the shopping device 102 when the monitored value of data within the memory 607 (e.g., the memory storage portion) exceeds a prescribed value. The prescribed value can include, e.g., some percentage amount or some actual amount of the value.

In certain embodiments, a secondary communication link can be established between the certain embodiments of the controller portion 619 of the shopping device 102. The secondary communication link can be structured similar to as the communication link 104, as described with respect to FIGS. 1-4, or alternatively can utilize network-based computer connections, Internet connections, etc. to provide data transfer between certain embodiments of the controller portion 619 of the shopping device 102 and the shopping control mechanism 106.

In certain embodiments of certain embodiments of the controller portion 619 of the shopping device 102, the particular elements of certain embodiments of the controller portion 619 of the shopping device 102 (e.g., the processor 605, the memory 607, the circuits 609, and/or the I/O 611) can provide a monitoring function to monitor the amount of images and/or image information contained therewithin. Such a monitoring function by the certain embodiments of the controller portion 619 of the shopping device 102 can be compared to a prescribed limit, such as whether the number of images contained in the memory 607, the amount of data contained within the memory 607, or some other measure relating to the memory is approaching some value. The limits to the value can, in different embodiments, be controlled by the user or the manufacturer of certain embodiments of the controller portion 619 of the shopping device 102. In certain embodiments, the memory 607 can store still images, video images, and/or audio images relating to, e.g., a still picture, camcorder, video, or audio embodiment of certain embodiments of the controller portion 619 of the shopping device 102.

In certain embodiments, the I/O 611 provides an interface to control the transmissions of digital information between each of the components in certain embodiments of the controller portion 619 of the shopping device 102. The I/O 611 also provides an interface between the components of certain embodiments of the controller portion 619 of the shopping device 102. The circuits 609 can include such other user interface devices as a display and/or a keyboard.

In other embodiments, the controller portion 619 of the shopping device 102 can be constructed as a specific-purpose computer such as an application-specific integrated circuit (ASIC), a microprocessor, a microcomputer, or other similar devices.

III. Certain Embodiments of Exemplar Recognition

This disclosure describes a number of embodiments of techniques for, and potential mechanisms for, exemplar recognition, by which an exemplar is recognized and/or identified as corresponding to particular goods, items, and/or services. Certain aspects of such recognition and/or identification can vary such that only one, none, or a number of items, goods, and/or services can correspond to the exemplar Certain embodiments of the exemplar shopping, as described in this disclosure with respect to FIGS. 1-4 and other locations in this disclosure, can rely on the shopper utilizing certain embodiments of the shopping device 102, which can upon interaction with the exemplar 104 provide exemplar item information associated with the exemplar and/or shopper input from the shopping device 102 to the shopper control mechanism 106. Upon receipt of the exemplar item information and/or the shopper input by certain embodiments of the shopping control mechanism 106 (which can be under the control of the store or vendor, etc.) the goods, items, and/or services should somehow be recognized. Certain embodiments of the recognition could be based at least in part on the exemplar item information and/or the shopper input obtained by the shopping device 102 and transmitted to the shopper control mechanism 106.

As described with respect to FIGS. 1 to 4, certain embodiments of the shopping device 102 can be maintained under the control of either the shopper alone, or the shopper in combination with the merchant or store (and/or possibly some transaction-related third party who might, for example, by providing credit for the shopping transaction and/or certain communications or networking aspects).

Recognition or identification can be based, at least in part on, a variety of recognition technologies that can include, but are not limited to: optical recognition systems, acoustic recognition systems, voice recognition systems, RFID recognition systems, physical contact recognition systems, electromagnetic recognition systems, and/or any suitable recognition which can be used to recognize or identify the goods, items, and/or services as corresponding to the exemplar 104. It is envisioned that such recognition systems may be modified as the associated technology changes and/or the use of the exemplar shopping mechanism 100 becomes more accepted.

Figure 9:
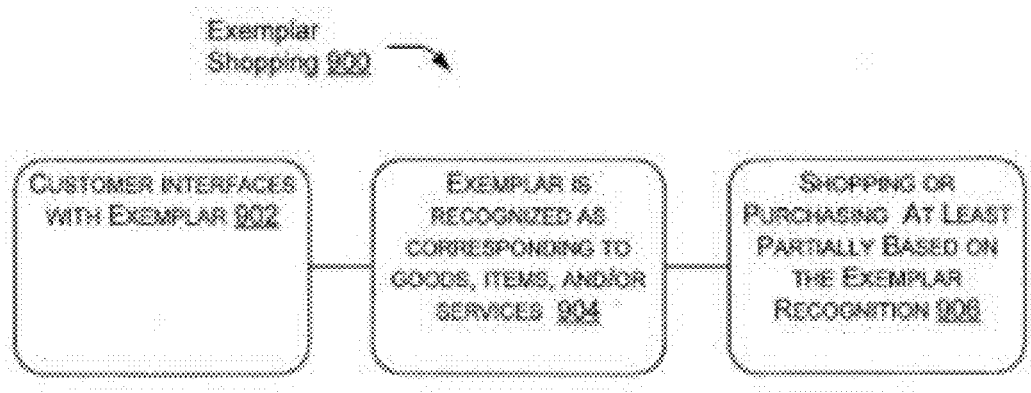
FIG. 9 shows a block diagram of one embodiment of exemplar shopping.

FIG. 9 shows one embodiment of shopping process 900 which includes steps 902, 904, and/or 906. Such steps are intended to be illustrative nature, and not limiting in scope. For example, in step 902, the customer interfaces with the exemplar using, for example, the shopping device 102 as described with respect to FIG. 1. Such interaction can include, but does not limited to, transmitting exemplar item information and/or shopping input from the shopping device 102 to the shopping control mechanism 106.

In 904, the shopping control mechanism 106 and/or the shopping device 102, as described with respect to FIG. 1, can recognize the exemplar as corresponding to the goods, items, and/or services. In certain embodiments, a certain amount of prompting and/or querying can be established between the shopping control mechanism 106 and/or the shopping device 102. Thereupon, once the identity of the goods, items, and/or services has been established by using the shopping device 102 and/or the shopping control mechanism 106, the goods, items, and/or services can be purchased within step 906 of the shopping process 900. Following the purchasing, the goods, items, and/or services can be carried out by the customer, or delivered to the customer in a variety of manners.

In this disclosure, a number of exemplar shopping mechanisms 100 are thereby provided which rely at least in part on interaction between the shopping device 102 and the shopping control mechanism 106 wherein the goods, items, and/or services are recognized or identified as corresponding to exemplar 104. Within this disclosure, such recognition or identification can take a number of forms, including the generation of the exemplar item information, and the transmissions of the exemplar item information from the shopping device 102 to the shopping control mechanism 106. In different embodiments, recognition or identification can take part entirely at the shopping device 102, entirely at the shopping control mechanism 106, entirely in the third intermediate device such as a network-based recognition system, or alternatively any combination of these and other devices.

Certain embodiments of exemplar shopping can involve at least one of the exemplars and/or the shopper control mechanism 106 being under the control of the store, vendor, retailer, or manufacturer who is at least partially responsible for selling, considering selling, offering for sale, or providing the goods, items, and/or services. For instance, FIG. 3 illustrates one embodiment of the exemplar 104 being configured as a canned and/or packaged product, etc. that can be shopped for using the shopping device 104.

IV. Certain Embodiments of Shopping Control Mechanisms, or Exemplar MERCHANTS AND/OR STORES Certain embodiments of exemplar shopping could not only effect how shoppers shop, but could also alter how stores themselves may be configured and/or operate. Within this disclosure, stores, vendors, retailers, manufacturers, etc. that offer at least one item, good, or service for sale are thereby referred to herein as "exemplar merchants and/or stores". Certain embodiments of the exemplar merchants and/or stores can be physical, while other embodiments can be on-line (e.g., electronic-based or computer-based). In certain instances, exemplar shopping can allow shopping to extend to many locations, even outside the physical exemplar merchant or store. Consider the configuration of the exemplar merchant or store as described with respect to FIG. 8, as described in this disclosure, to realize how exemplar shopping can affect the shopping experience.

By allowing goods, items, and/or services to be sold using exemplars as described in this disclosure, a number of changes can be made to retailers, vendors, and/or manufacturers as described in this disclosure. Certain embodiments of the exemplar merchants and/or stores may allow for a disassociation between portions of the store that display and/or allow recognition of the exemplars, as well as portions of the store, the stock goods or items (e.g., on the shelves). Such disassociation can be especially valuable it particularly expensive areas, such as in certain locations within crowded cities, etc. where store space for the goods or items may be at a premium. Certain embodiments of exemplar shopping can be applied across a variety of economic, social, national, and other boundaries since shoppers, in general, desire to have an improved shopping experience. In certain embodiments, an exemplar displaying and recognizing portion of the exemplar merchant and/or store to be situated in close proximity to customers, even Perhaps partially outside while the stocking portion of the exemplar merchant and/or store could be situated in a completely remote location.

Certain embodiments of the shopping that includes a variety of the exemplars as described in this disclosure allows for certain stores to provide goods, items, and/or services for their customers closely tailored to the customer's desires. For example, certain traditional shopping techniques involve stores stocking a large number of goods and/or items based on what most customers would likely purchase. Certain ones of these traditional stores have been designed based at least in part by realizing that they would be less competitive at selling, considering selling, or offering for sale, odd or unusual sizes, colors, styles, etc. of goods, items, and/or services that relatively few people may be seeking as compared with the more typical sizes, colors, styles, etc. To maximize profits, certain traditional stores offer what a larger number of people are likely to purchase in greater qualities. As such, many stores that sell such products as clothing, hardware, etc. may tend to offer similar high-turnover versions of such goods or items. As such, the goods or items provided by certain traditional stores may appear virtually indistinguishable. Many shoppers may not wish to shop at such traditional stores since many of them may carry such similar or indistinguishable goods since shopping may become more boring. Certain embodiments of exemplar shopping may allow more varied, experimental, novel, or distinct goods, items, and/or services to be provided by the exemplar merchants or stores.

Certain embodiments of the exemplar merchants and/or stores may also competitively provide less popular goods, items, and/or services that fewer people may be requesting, but which are precisely what these people want. As such, certain customers may prefer the improved variety and selection, as well as the ability to buy goods, items, and/or services more closely resembling what they actually want. Consider that if certain traditional stores did stock large numbers of odd or unusual colors, sizes, styles, etc. of the goods, items, and/or services, then it is likely that many of these goods, items, and/or services may not sell (or would turn over slowly), and would ultimately represent lost profit for the traditional store. As such, many traditional retailers, stores, manufacturers, etc. may sell or produce goods, items, and/or services only of common sizes, colors, styles, types, etc. that usually have high demand.

By comparison, certain embodiments of the exemplar merchants and/or stores that provide for shopping using exemplars, as described in this disclosure, can allow shoppers to provide more of their own, personal, or other input as to which goods, items, and/or services they wish to purchase based at least in part on the exemplars. Certain embodiments of the exemplar shopping as provided by certain exemplar merchants and/or stores could allow potential buyers to select goods, items, and/or services based more on their individual tastes, likes, desires, etc. Additionally, certain embodiments of exemplar merchants and/or stores, the retailers, manufacturers, stores, etc. may not have to worry as much about stocking or producing goods, items, and/or services that would not be sold, since the potential customer is indicating more precisely what they wish to purchase (instead of often having to settle for what might be offered by traditional stores or merchants). In certain embodiments, such exemplar merchants and/or stores could become more of a reactive distributor of popular or desirable goods, items, and/or services as compared to an area in which less popular goods, items, and/or services may be provided; but more common goods, items, and/or services might also be stocked.

In certain embodiments, such use of exemplars would allow exemplar merchants and/or stores to more efficiently utilize their valuable space. As such, certain embodiments of exemplar merchants and/or stores could be configured as a store of limited size (which almost all stores are) that include primarily exemplars that might be able to include exemplars of different areas that they traditionally sell. Consider that stores that are configured as exemplar merchants and/or stores would only have to output the expense to purchase exemplars, instead stocking the store, when they are considering offering less typical goods, items, and/or services.

In certain embodiments, it is likely that exemplar merchants and/or stores could radically modify their services, personalities, items, services, and/or goods extremely quickly to reflect demand, simply by changing the exemplars contained therein. For example, a particular exemplar merchant and/or store that is selling considering selling, or offering for sale shoes using exemplars may find it much more profitable at their particular location to sell other goods or items such as clothes; or certain exemplar merchants and/or stores (which might be under-performing) could even provide exemplars representing entirely different goods, items, and/or services such as tools. Such a transition can even occur while maintaining their original line of goods, on a trial basis, and/or in some other experimental manner. A variety of exemplar promotional offers can also be provided, such as if a buyer is provided a discount for purchasing particular goods, items, and/or services. In certain instances, exemplar merchants and/or stores could thereupon be highly reactive or responsive to the demands and desires of shoppers, and could soon thereafter gain popularity.

Certain embodiments of exemplar shopping can utilize an exemplar that is not under the control of the store, vendor, retailer, or manufacturer that is at least partially responsible for selling considering selling, or offering for sale the goods, items, and/or services. In certain embodiments, the exemplar may not be under control of the store, vendor, seller, manufacturer, etc., but can indicate an item, good, or service that the shopper is querying whether the store, vendor, retailer, or manufacturer could provide. For example, a potential customer might see goods, items, and/or services they wish to consider purchasing being used by another person (perhaps on the street, at a sporting event, at another store, etc.). Alternately, particular shoppers may even be seeking to replace or obtain additional similar goods, items, and/or services to those previously obtained that are no longer being offered at traditional stores. Additionally, certain embodiments of exemplar merchants and/or stores could offer similar goods as traditional stores, but could display considerably fewer goods and/or items.

Another embodiment of shopping using exemplars can involve, for example, goods for construction, hardware, etc. as described with respect to FIG. 4. One illustrative, but not limiting example, can involve the shopper who might be a home builder or a construction worker who wishes to do a project. In certain instances, there might be a variety of "know-how" or additional service associated with doing such projects. The shopper can, for example, capture or photograph an image or photograph of a similar (perhaps) completed project which may act as the exemplar, transfer the image or photograph of the exemplar (in addition to the dimensions, various options, etc., if necessary or desirable) to the retailer or manufacturer, and the retailer or manufacturer can suggest suitable materials or goods to utilize for the exemplar-based project.

For example, suppose the shopper wishes to add a garage to their house, and the shopper likes a particular configuration and/or type of building material of another garage or structure that they saw. In certain embodiments, the other garage can be used as the exemplar. In certain instances, the retailer or manufacturer would know whether they have the materials and expertise to undertake the project, or alternatively if they don't, another manufacturer, retailer, merchant or store that does. Perhaps in certain instances a manufacturer or retailer would be able to provide (or could obtain) a kit or prefab which might be suited to perform the entire project based, at least in part, on the exemplar. One advantage of shopping using exemplars as related to construction, hardware, etc. is that often the manufacturer and/or retailer might have more experience of how to do a project effectively based on the exemplar item information and/or shopper input, and what goods or services might be necessary. Such expertise or know-how can be readily applied, where in other circumstances perhaps the retailer or manufacturer might have had to actually travel to the building or project site to be able to utilize such expertise, know-how, or judgment; or alternatively be somewhat uncertain as to the final configuration of materials, etc.

Additionally, in certain instances, the shopper such as a home-owner or construction worker may desire to judge and/or determine whether to purchase used construction or hardware techniques and/or devices on how well the techniques and/or devices withstand the "test of time". Additionally, allowing the shopper to utilize exemplars in this manner may allow the shopper to gain sufficient confidence about actually being able to complete the project (or have the particular retailer, manufacturer, etc. complete or assist in the project), and/or decide to undertake the project. In this manner, by the shopper being able to, in certain instances, utilize the particular expertise of the retailer or manufacturer, the shopper may be able to gain further confidence in properly performing a desired task or operation.

With certain embodiments of exemplar shopping, the seller, store, vendor, retailer, and/or manufacturer can indicate to the customer that they can sell, or obtain to sell, the goods, items, and/or services that the buyer or customer wishes to obtain. For instance, potential customers who are seeking goods, services, or products offered by the seller, store, vendor, retailer, and/or manufacturer could be situated in a location. Since relatively few of the locations that potential customers or shoppers frequent are actually under the control or influence of the seller, store, vendor, retailer, and/or manufacturer, exemplar shopping can open more venues to shopping. For instance, certain embodiments of the exemplar merchant or store can operate well at such events and locations as a street location, a sporting event, an office, or virtually any location that people congregate. Additionally, certain embodiments of the exemplar shopping (either electronic-based or physical) can be configured to allow users or shoppers to shop for goods, items, and/or services even when they are not situated within the store. There are a variety of instances when a potential shopper who is located outside, at a sporting events, in an office, etc. comes in contact with goods, items, services, etc. that might be desired to be purchased.

Certain embodiments of such exemplars can utilize a relatively small amount of space compared to items or goods stored within a fully-stocked traditional store, and it can be envisioned how such exemplar merchants and/or stores can provide a relatively large number of displayed exemplars for their customers. As such, it might not be necessary for customers to walk such a large distance between distinct stores, when exemplar merchants and/or stores could likely offer such goods and smaller space.

In certain instances, exemplar merchants and/or stores can even act as subjugate stores, such as could occur when a customer provides a request for the recognizable good, service, or product, at least partially based on the exemplar. In certain instances, the exemplar merchants and/or stores might even be able to charge a premium for such reactive and responsive service. It should be evident that many embodiments of exemplar merchants or stores could be cost efficient reactive to consumer desires and demands, and easily adaptable.

In addition, stocking traditional stores can demand a considerable amount of effort and expense on the part of the store, and can also interfere with shopping efficiency and/or enjoyment by certain customers. Consider, for example, that certain traditional grocery, department, or other retailers or vendors may be forced to wait to stock shelves with the goods or items until either the store is closed and/or until some late hour after which the customer traffic is low. Typically, such stocking employees of certain traditional stores may have to be paid additional money, and/or work at some undesirable time. Certain embodiments of the exemplar merchant and/or store may allow the stocking operations to be provided in the rear of the store, automatically, and/or using some technique that could improve the efficiency of the store operations while being out of sight of customers and/or not interfering with customer shopping.

With certain embodiments of the exemplar merchants and/or stores, the goods can be stocked at some remote location relative to the customers (e.g., the back of the store) such that the stocking operations do not have to interfere with the shopping process or enjoyment by the customers. In other embodiments of the exemplar merchants and/or stores, the goods, items, and/or services can be ordered on an as-ordered basis. As such, certain embodiments of the exemplar merchants and/or stores would not have to maintain such large supplies of stocked goods and/or items.

In addition, certain customers may not enjoy certain aspects of shopping at traditional stores. For example, certain traditional stores may be shopped-out, especially after a sale, etc. Certain embodiments of traditional stores may not offer a varied selection, but only offer goods, items, and/or services having a high turn-over. Since many embodiments of the exemplar merchants and/or stores might not involve the typical influx and outflux of goods, the exemplar merchants and/or stores might appear as completely stocked with their exemplars. Additionally, certain goods and/or items such as frozen foods might need some special treatment such as refrigeration, which certain traditional stocked stores such as grocery stores might have difficulty in effectively providing and may interfere with efficient shopping operation. Consider that refrigerator sections may be difficult to stock, and also may be expensive to cool with customers and store owners continually opening the doors to the refrigerators, etc. Certain embodiments of exemplar merchants and/or stores can be modified to better deal with such special treatment goods, items, and/or services in stocked areas. For example, frozen goods and/or items for grocery embodiments of exemplar merchants and/or stores can be maintained in a freezer situated in the stock-room, which only store employees (but not customers) might be exposed to during stocking or filling exemplar orders. The customers may never have to see, or come in contact with certain such special need to goods, items, and/or services such as refrigerated goods and/or items, and instead could interface with exemplar versions thereof.

There could be a variety of exemplar merchants and/or stores, such as described in this disclosure, which can represent modification of traditional stores or merchants. Consider traditional mall store configurations, in which there may be from one to several "anchor" stores with many smaller stores distributed throughout each mall. Such traditional mall stores could be modified and/or modernized to include exemplar merchants and/or stores, either as all or part of either the anchor stores or as the other mall stores. By using exemplar merchants and/or stores in the mall, it is likely that customers would not have to travel to as many distinct stores to consider purchasing their desired goods or objects. These exemplar mall stores could provide goods in a manner responsive to their customers, and thereby establish a more loyal customer base.

With traditional city or town type stores, each city or town may have none to a number of department stores, as well as a considerable number of smaller stores. Such traditional city or town department stores as well as other smaller city or town stores could be modified and/or modernized as exemplar merchants and/or stores. These city or town stores could provide goods in a manner more responsive to their customers, and thereby establish a more loyal customer base. Certain embodiments of exemplar merchants and/or stores would likely be able to sell a similar number or variety of goods, items, and/or services using exemplar techniques as a considerably larger traditional store.

Consider a particular shopper who is searching for a particular item. By utilizing certain embodiments of the exemplar merchant and/or store, the customer could "shop" through several stores electronically (but perhaps not physically), using their shopping device 102, wherein the shopper can determine the best deal and/or best product without even having to visit each exemplar merchant and/or store from which the goods, items, and/or services are being considered. As such, certain embodiments of exemplar merchants and/or stores can represent a time savings since certain shoppers may not have to directly indicate to salespersons; etc. precisely about the goods, items, and/or services which they may be searching for. Also, shoppers of certain embodiments of exemplar merchants and/or stores may less likely have to settle for a limited number or selection of goods, items, and/or services. In addition, establishing certain embodiments of the exemplar merchants and/or stores could be less expensive to maintain since they do not have to stock large numbers of items. In certain instances, different (and even competing) stores can utilize at least part of the same offered goods, items, and/or services. In certain instances, fewer exemplar merchants and/or stores might provide a similar variety or number of goods, than with traditional stores, and fewer stocked goods might have to be sacrificed or discounted if the store goes under and/or decides to sell other goods, items, and/or services. Configuring a variety of stores as exemplar merchants and/or stores might allow such stores that were previously not profitable to become profitable, or alternatively increase the profits of such exemplar merchants and/or stores.

Owning stores and/or investing in stores almost always represents a great risk (especially with traditional stores). A large number and variety of questions appears applicable to almost all stores such as will the store be profitable? Is the store of the correct size? Are we selling, considering selling, or offering for sale the proper or the correct variety of goods, items, and/or services? Are we at the correct location? Will we be open in six months or two years? Such questions illustrate the large number of uncertainties inherent in store operation or ownership (whether the store is physical or electronic-based). Exemplars can be utilized by a variety of such stores to potentially increase their profitability, direct their focus, and/or allow them to better react to and realize their customer needs and desires, while providing greater customer service.

Such exemplar merchants and/or stores can relatively quickly change character or items, goods, or services for sale by quickly altering the exemplars being offered within the exemplar merchant or store. It may not be necessary that any particular store be entirely an exemplar merchant and/or store or a traditional store. A store that offers one or more items, goods, or services for sale utilizing exemplars can be, depending upon context, considered an exemplar merchant and/or store. For instance, a store owner or operator that wishes to evaluate how well a particular line of goods, items, and/or services would sell could utilize the exemplar merchant and/or store to provide a trial mechanism to evaluate the particular goods, items, and/or services; and/or evaluate the particular exemplar merchants and/or stores. In certain instances, the owners or operators of the store could rapidly ascertain the inherent benefits of exemplar merchants and/or stores, but might be wary about completely transitioning to become a complete exemplar merchant and/or store. As such certain embodiments of merchants or stores, retail locations, manufacturing locations, etc. can transition (in any percentage or at any rate) from the traditional store style into the exemplar merchant and/or store on an as-desired or as-efficient basis. This transition rate can be selected to ease the customers into the concepts and/or techniques of the exemplar merchants and/or stores. Certain ones of such stores, retail locations, manufacturing locations, etc. could also experiment with a relatively small exemplar portion that might be expected to expand over time.

Certain exemplar merchants and/or stores can be set up on a temporary basis and/or away from other traditional retail store locations. For example, a model show or fashion show can be established by a clothing store (either as a physical store or at a remote location), in which instances shoppers or potential buyers do not have to feel self-conscious about taking pictures of others displaying the exemplars to use for exemplar shopping. In certain instances, the customers would not have to travel to the actual store location where the exemplars are being displayed or modelled, but could purchase the goods, items, and/or services at the remote location.

In certain instances, a number of customers and/or their shopping devices can even interact (akin to the Tupperware parties) to shop one or more exemplar merchants or stores. Such customer shopping can be performed at one or more of the stores of the customers, on-line using certain embodiments of the shopping device, at one or more exemplar merchants or stores, and/or at some other location such as on the street, in a restaurant, in a workplace, at an exercise location, etc. Certain of these types of shopping can be encouraged, for example, by certain exemplar merchants and/or stores providing bonuses, discounts, etc.

Certain embodiments of model homes and/or exemplar homes can be provided by which potential shoppers can peruse a variety of furniture, hardware, electronics, computers, and/or other goods, items, and/or services: and capture images of those goods, items, and/or services in which they have some interest. In addition, the shoppers can input some additional exemplar item information, such as desired manufacturer, style, etc. Similarly, the manufacturer or retailer can respond to associated queries and/or list of goods that they could provide. In this manner, potential shoppers could utilize exemplar merchants and/or stores, or exemplar shopping in a variety of instances as compared to traveling to stores that may be located at a distant location, or may be difficult or time-consuming for travel.

Certain embodiments of the shopping device 102 can be configured to recognize the goods, items, and/or services that correspond to the exemplars, and thereupon allow the customers the option to buy the goods, items, and/or services. For example, certain embodiments of the shopping device 102 can image a photograph or image of the item (or use some other mechanism to recognize or identify the goods, items, and/or services), and thereupon allow the customer or shopper to buy, price, evaluate, and/or perform some other process relative to recognized goods, items, and/or services.

As such, certain embodiments of the recognition step can be performed as part of a one click buy operation, or as an addition of the exemplar item information and/or the shopper input to a photograph, an image, a personal catalog, etc. Certain embodiments of images, pictures, etc. could be associated with or acquire the exemplar item information and/or the shopper input such that people, including, e.g., the individuals associated with the catalog, images, or pictures (or alternately friends, associates, or acquaintances of the individuals) could review the user's images, photographs, or catalogs, such as by using the shopping device, to obtain the exemplar item information. The exemplar item information could be used either alone and/or with shopper input to shop for the goods, items, and/or services. Certain embodiments of such catalogs, images, or pictures could be considered as the embodiment of exemplars, in which the personal catalogs, images, and/or photographs can include the exemplar item information in a variety of formats. There a variety of aspects as to how the catalog, photographs, and/or images can recognize the exemplar item information as included.

Certain embodiments of the exemplar shopping mechanism 100 can be configured to provide a de-obfuscation service to customers, or preferred customers. Consider that imaging or photographing book covers or product codes might imply that exemplar merchants or stores may want to obfuscate. As such, certain embodiments of the exemplar shopping mechanism may be configured to provide (e.g., software, hardware, firmware, etc.) that limits such obfuscation to the goods, items, and/or services. Thereby certain embodiments of the exemplar shopping mechanism 100 may be configured to limit such obfuscation attempts. In certain instances, such de-obfuscation service could be sold or provided to preferred customers. Implies there needs to be mapping UI/IP as part of recognition.

Figure 7:
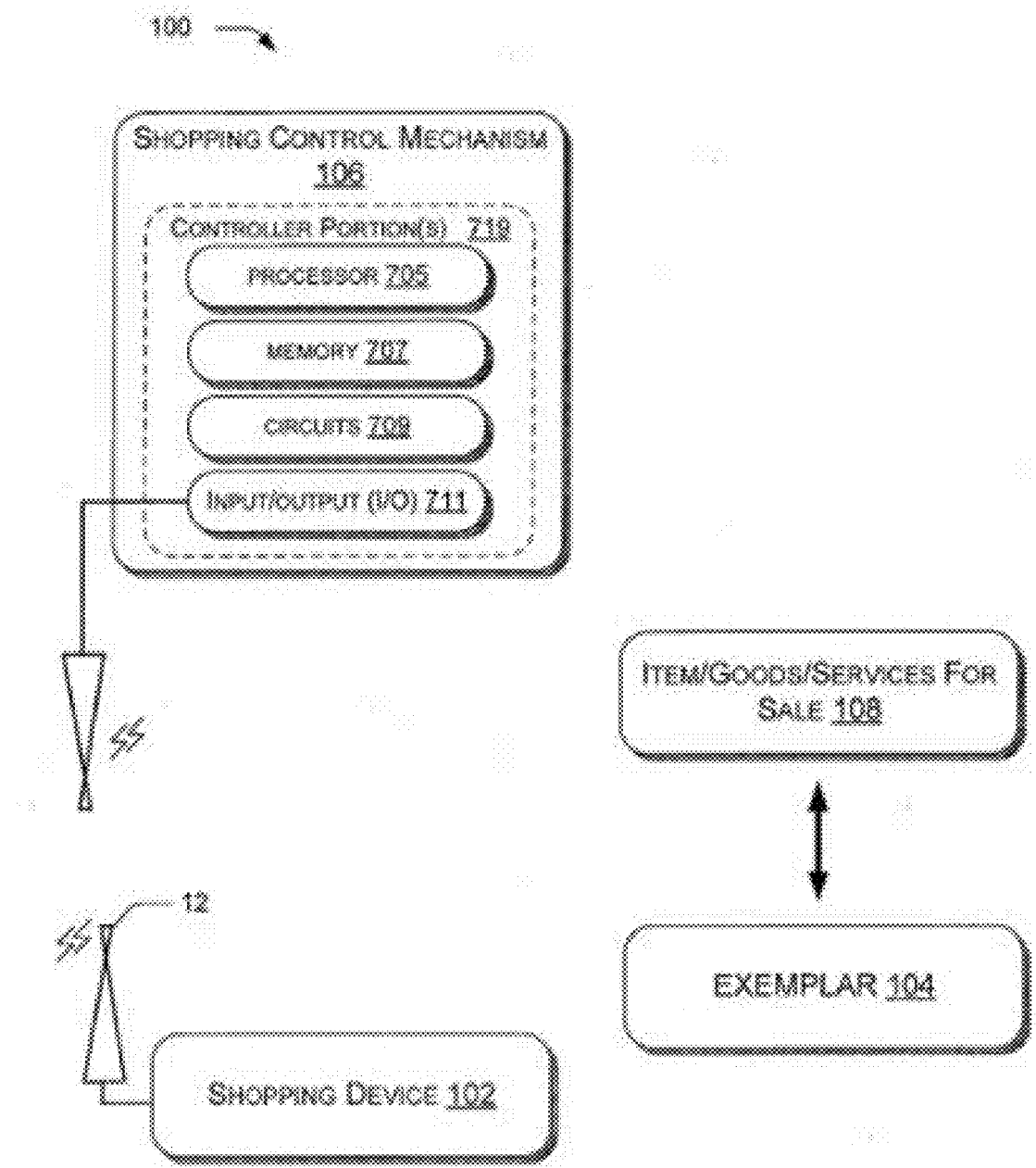
FIG. 7 is a block diagram of another more detailed embodiment of an exemplar shopping mechanism, being utilized for shopping.

A more detailed embodiment of the exemplar shopping mechanism 100 is now described with respect to FIG. 7. FIG. 7 shows another embodiment of the exemplar shopping mechanism 100 that includes the shopping device 102 and the shopping control mechanism 106, in addition to the exemplar 104. Certain embodiments of the shopping control mechanism 106 can be computer, mote, and/or electronics based. As such, this disclosure describes a number of components of the shopping control mechanism 106 that can operate utilizing computer-based technology. As described within this disclosure, multiple ones of the different embodiments of the shopping control mechanism 106 (e.g., the controller portion 719) can transfer image information, one or more portions of images, other information, etc. to each other via a communication link to or from the shopping device 102 or some intermediate device. One embodiment of the controller portion 719 of the shopping control mechanism 106 can include a processor 705 such as a central processing unit (CPU), a memory 707, a circuit or circuit portion 709, and an input output interface (I/O) 711 that may include a bus (not shown). Different embodiments of the controller portion 719 of the shopping control mechanism 106 can be a general-purpose computer, a specific-purpose computer, a microprocessor, a microcontroller, a personal display assistant (PDA), a cellular phone, a wireless communication device, a hard-wired phone, and/or any other known suitable type of communications device, computer, and/or controller that can be implemented in hardware, software, electromechanical devices, and/or firmware. Certain portions of the controller portion 719 of the shopping control mechanism 106 can be physically or operably configurable in each shopping control mechanism 106 as described with respect to FIGS. 1 to 4. In one embodiment, the processor 705 as described with respect to FIG. 7 can perform the processing and arithmetic operations for certain embodiments of the controller portion 719 of the shopping control mechanism 106. Certain embodiments of the controller portion 719 of the shopping control mechanism 106 controls the signal processing, database querying and response, computational, timing, data transfer, and other processes associated with certain embodiments of the controller portion 719 of the shopping control mechanism 106. In certain embodiments, one more simplified version of certain embodiments of the controller portion 719 shopping control mechanism 106 can configured to provide a transfer of exemplar item information, shopper input, and other such information between certain embodiments of the controller portion 719 of the shopping control mechanism 106.

Certain embodiments of the memory 707 include random access memory (RAM) and read only memory (ROM) that together store the computer programs, operands, and other parameters that control the operation of certain embodiments of the controller portion 719 of the shopping control mechanism 106. The memory 707 can be configurable to contain the exemplar item information, shopper input, and other such information obtained, retained, or captured by that particular controller portion 719 of the shopping control mechanism 106.

Certain embodiments of the bus is configurable to provide for digital information transmissions between the processor 705, circuits 709, memory 707, I/O 711, and/or the image memory or storage device (which may be integrated or removable). In this disclosure, the memory 707 can be configurable as RAM, flash memory, semiconductor-based memory, of any other type of memory that is configurable to store data pertaining to images. The bus also connects I/O 711 to the portions of certain embodiments of the controller portion 719 of the shopping control mechanism 106 that either receive digital information from, or transmit digital information to other portions of the exemplar shopping mechanism 100.

Certain embodiments of the controller portion 719 of the shopping control mechanism 106 as described with respect to FIG. 6 includes a transmitter portion (not shown) that can be either included as a portion of certain embodiments of the controller portion 719 of the shopping control mechanism 106, or alternately can be provided as a separate unit (e.g., microprocessor-based). In certain embodiments, the transmitter portion can transmit image information between certain embodiments of the controller portion 719 of the shopping control mechanism 106 with the shopping device 102 over wired and/or wireless communication links.

Certain embodiments of the controller portion 719 of the shopping control mechanism 106 as described with respect to FIG. 6 includes an operation altering portion (not shown) that can be either included as a portion of certain embodiments of the controller portion 719 of the shopping control mechanism 106, or alternately can be provided as a separate unit (e.g., microprocessor-based). Examples of operation altering portions include, but are not limited to, altering a resolution, altering a contextual library, altering an aspect ratio, altering a color intensity and/or brightness or particular shopping devices.

The memory 707 can provide one example of a memory storage portion. In certain embodiments, the monitored value includes, but is not limited to: a percentage of the memory 707, a number of images that are stored in the memory 707, or for motion images a recording interval (audio or video recording intervals).

To provide for overflow ability for the memory 707 of certain embodiments of the controller portion 719 of the shopping control mechanism 106, the image storage device can be operably coupled to the memory 707 to allow a controllable transmitting of memory data from certain embodiments of the controller portion 719 of the shopping control mechanism 106 when the monitored value of data within the memory 707 (e.g., the memory storage portion) exceeds a prescribed value. The prescribed value can include, e.g., some percentage amount or some actual amount of the value.

In certain embodiments, a secondary communication link can be established between the certain embodiments of the controller portion 719 of the shopping control mechanism 106. The secondary communication link can be structured similar to as a communication link, or alternatively can utilize network-based computer connections, Internet connections, etc. to provide data transfer between certain embodiments of the controller portion 719 of the shopping control mechanism 106.

In certain embodiments of the controller portion 719 of the shopping control mechanism 106, the particular elements of certain embodiments of the controller portion 719 of the shopping control mechanism 106 (e.g., the processor 705, the memory 707, the circuits 709, and/or the I/O 711) can provide a monitoring function to monitor the amount of images and/or image information contained therewithin. A monitoring function as provided by certain embodiments of the controller portion 719 of the shopping control mechanism 106 can be compared to a prescribed limit, such as whether the number of images contained in the memory 707, the amount of data contained within the memory 707, or some other measure relating to the memory is approaching some value. The limits to the value can, in different embodiments, be controlled by the user or the manufacturer of certain embodiments of the controller portion 719 of the shopping control mechanism 106. In certain embodiments, the memory 707 stores motion images, video images, and/or audio images relating to, e.g., a motion picture, camcorder, video, or audio embodiment of certain embodiments of the controller portion 719 of the shopping control mechanism 106.

In certain embodiments, the I/O 711 provides an interface to control the transmissions of digital information between each of the components in certain embodiments of the controller portion 719 of the shopping control mechanism 106 and the shopping device 102. The I/O 711 also provides an interface between the components of certain embodiments of the controller portion 719 of the shopping control mechanism 106 and the shopping device 102. The circuits 709 can include such other user interface devices as a display and/or a keyboard.

In other embodiments, the controller portion 719 of the shopping control mechanism 106 can be constructed as a specific-purpose computer such as an application-specific integrated circuit (ASIC), a microprocessor, a microcomputer, or other similar devices.

V. Sequencing of Goods, Items, and/or Services and People

This disclosure provides a number of embodiments of open retail logistics. For example, certain embodiments of the inventory of the merchant or store can be layered, and delivery from the merchant or store to the customer can be customized on a per goods, items, and/or services basis. In certain embodiments, delivery can be performed in substantial-real time. However, it is important that the shopping control mechanism 106 be configured appropriately as the back end functionality for the exemplar shopping mechanism 100.

Figure 10:
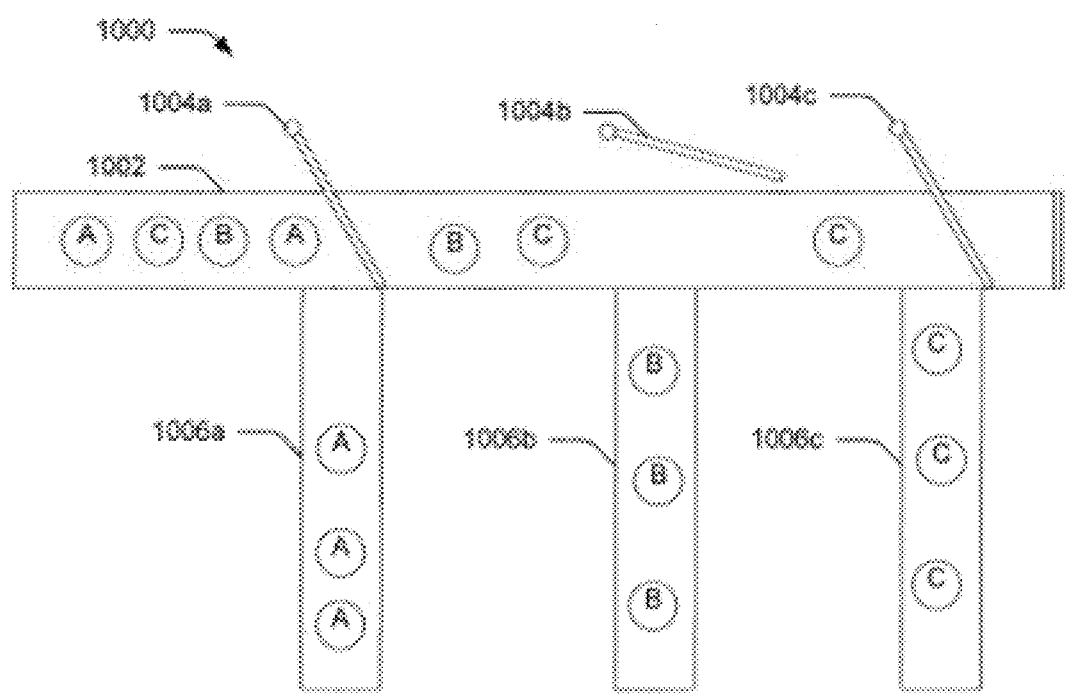
FIG. 10 shows a view of one embodiment of a distribution mechanism.

FIG. 10 shows one embodiment of a distribution mechanism 1000 that can be configured to distribute the goods, items, and/or services (e.g., certain embodiments of the services can include software, firmware, hardware, etc.) to a number of customers. In FIG. 10, the goods, items, and/or services can initially travel down a common conveyor mechanism 1002, whereby the number of diverting switches 1004*a*, 1004*b*, and 1004*c* can divert the goods to their respective individual conveyor 1006*a*, 1006*b*, and 1006*c*. Distinct customers can be associated with each respective individual conveyor 1006*a*, 1006*b*, and 1006*c*. In different embodiments, the respective individual conveyor 1006*a*, 1006*b*, and 1006*c* can be directed to a particular checkout location, a particular delivery location or system, etc. as desired and/or suitable for the particular exemplar merchant and/or store.

It is envisioned that the distribution mechanism 1000 can be configured using a variety of systems and/or techniques including, but not limited to: hardware, software, firmware, electromechanical, pneumatic, and/or manual. As such, the distribution mechanism 1000 can be largely automated, and as such could utilize a number of robots; or largely manual, and as such could utilize a number of stock persons. The particular distribution mechanism 1000 to be utilized by one or more of the exemplar mechanisms or stores can be determined based on a number of factors including, but not limited to, numbers and expense of the goods, items, and/or services; the configuration and commonality of the exemplar merchants or stores; the technical expertise of the exemplar merchants or stores and/or their customers.

Certain embodiments of the shopping control mechanism 106 and/or the exemplar merchant and/or store can be configured with a mechanism to locate and/or distribute goods, items, and/or services efficiently after or while the consumer shops. Such a mechanism to locate and/or distribute the goods, items, and/or services can depend largely upon the type of exemplar merchant and/or store. For example, certain embodiments of exemplar merchants or stores could utilize largely automated delivery and sequencing portions, whether the exemplar merchant or store is physically-based or electronically-based. As such, goods, items, and/or services can be automatically, or semi-automatically delivered upon purchasing by the shopping device 102. In certain instances, it might be important to identify locations of the goods, items, and/or services to a reasonable degree of precision to enhance the distribution, recognition, and/or identification processes.

Other embodiments of exemplar merchants or stores will be primarily manual, whereby stock persons could fill orders in the stock room of the exemplar merchant or store. Considering how many unfilled orders there are, size or complexity of the order, the number of workers in the stock room, and the rate which they are working, some estimate can be provided to shoppers as to when delivery could be expected. Certain customers would appreciate having access to an expected time to fill and/or deliver their order.

Certain embodiments of the exemplar shopping mechanism 100 can thereby identify possible delivery scenarios and communicating these to the consumer similar to as described with respect to FIG. 10. In certain embodiments, the shopping control mechanism 106 can be configured to provide delivery, sequencing, and other related functionality. Certain embodiments of the sequencing can include goods sequencing which can be considered as sequencing the goods purchased by a particular customer to be delivered to the particular customer.

Certain embodiments of the sequencing can include customer sequencing, under which instances certain customers can be diverted for a sufficient duration to allow the goods to be delivered to the customer. It may be desired, for example, that the particular customer that has a large order to fill may be sequenced to wait for a longer duration than one that has relatively few items, or whose items are relatively easy to fill. As such, certain embodiments of the shopping control mechanism 106 included with exemplar merchants or stores can provide express functionality under which instances certain shoppers, who have relatively few or easy-to-fill items, can expect to proceed quickly through check out from the exemplar merchant or store.

As such, certain embodiments of sequencing may be viewed as managing customers and/or managing goods, items, and/or services. In certain instances, sequencing may include managed delays or distractions. For example, if the shopping control mechanism 106 can determine that the user or customer is on a course to reach the checkout counter before that particular customer's goods, items, and/or services will arrive, the customer may be offered a promotion to wait in some desired location (such as at any coffee shop or a bookstore). As such, certain embodiments of the shopping control mechanism 106 and/or the exemplar merchant and/or store cabbie configured to manage people based on a variety of factors such as their order, the complexity of their order, the number people in the store awaiting delivery, etc.

In certain instances, the customer's history in filling orders can be taken into account. Also, certain embodiments of the exemplar merchants or stores can transmit an indicator from shopping control mechanism 106 to certain embodiments of the shopping device 102 by which the likely time of fulfillment of the customer's order is displayed. As such, certain customers may wish to go somewhere else until the order is filled.

Sequencing, in effect, attempts to correlate the delivery of the goods, items, and/or services such as may occur in the stock room of a store with a customer interaction that is occurring in front (e.g., exemplar portion) of the store. Many of the actions that have traditionally occurred at the front of traditional stores, such as bagging, payment, stocking of goods, pricing, etc. may occur in traditional exemplar storage. In such, many embodiments of the exemplar merchants or stores may appear different from the traditional stores. For example, it might be envisioned that in a grocery exemplar merchant or store, the customers might wait near the front for packaged goods to be delivered to them, with the groceries all bagged when delivered. Certain embodiments of exemplar merchants or stores will be configured to make the area which the customers can wait as enjoyable as possible. For example, a coffee shop, a bookstore, or even a game-room to be provided in front of certain embodiments of exemplar grocery stores. It is no secret that many shoppers least favorite time relates to waiting in line, and certain embodiments of the exemplar merchants or stores provides a delivery option by which certain time in the shopping store can be made more enjoyable.

Improvements in technology allow for delivery to be performed at a variety of locations. For example, the customer shopping at a number of stores during a shopping trip can direct goods or items obtained in the first store to be delivered to a second store, or even to a different location under the control of a third party. In other embodiments, the goods, items, and/or services can be arranged to be delivered in the home of the user, or some alternate location.

There can be a variety of techniques that may be used by manufacturers or retailers to respond to shopping using exemplars. Different degrees of automation may be utilized to distribute the exemplars, that could range from a stockperson going to obtain the desired goods to such goods being automatically distributed by a robot, a conveyor, or similar mechanism. As such, different embodiments of exemplar merchants or stores can vary considerably. In embodiments where multiple merchants or stores are sharing a delivery mechanism (e.g., the stores within a mall, or the stores on a city block share the delivery mechanism), then merchants or stores can also share the expense associated with the delivery. By spreading the expense of delivery between more stores, delivery becomes a more economical option. In certain instances, it may be possible for a number of such stores (or a third party such as a mall owner or operator) to provide delivery for all goods or items from a number of stores to customers, or only in certain instances where a value of the goods or items exceeds some limit.

Certain embodiments of the shopping control mechanism 106 can include a scheduling mechanism that can schedule when goods, items, and/or services are to be delivered to check out. In certain embodiments, the shopper may or may not place the goods, items, and/or services in their cart, but only store the exemplar item information and/or the shopper input. If the shopper stores the exemplar item information and/or the shopper input (perhaps because the goods, items, and/or services is not physically present, does not physically fit into the physical cart, or perhaps because the goods, items, and/or services is not present in a desired color, style, etc.) then when the shopper buys the goods, items, and/or services using the shopping device such as within the exemplar merchant and/or store, then the goods, items, and/or services can be the delivered to the shopper at some receivable location. The inventory management system (which might in certain embodiments span several stores, and/or might be situated mall wide and/or be situated outside of the mall) then can start the process of delivering the goods, items, and/or services to the consumer and variety of locations such as the side of the store, at their home, etc. In certain embodiments, this can amount to bringing the goods, items, and/or services from some other inventory location (possibly remote), and then based at least partially upon the scheduling, provide the goods, items, and/or services to the checkout counter by the time the shopper arrives there.

Certain embodiments of the shopping control mechanism 106 and/or the exemplar merchant and/or store may add incentives or other offers to the customers under a variety of scenarios. In certain instances, these scenarios may be valued against restocking, store traffic, and other considerations. In certain embodiments, the shopping control mechanism 106 and/or the exemplar merchant and/or store may identify cross promotions or related goods, items, and/or services. For example, if a particular product typically requires additional parts such as, for example: batteries, the adapters, software, etc., then the customer may be prompted as to whether they wish to purchase such additional parts.

Certain embodiments of the shopping control mechanism 106 and/or the exemplar merchant and/or store could be configured to identify alternatives to selected goods, items, and/or services, and perhaps offering them at a reduced rate if, for example, selling, or considering selling, them instead might have a more desirable effect on inventory. As such, the customers could be directed toward easier-to-fill inventory or goods, items, and/or services. Certain embodiments of the shopping control mechanism 106 and/or the exemplar merchant and/or store could all be configured to offer compensation or incentives to take alternative delivery. For example, a customer that is willing to wait for home delivery instead of taking the goods, items, and/or services from the shelf may be provided a discount, or a gift certificate, etc.

VI. Certain Embodiments of Benefits of Exemplar Shopping

By utilizing exemplars and exemplar shopping, in many instances, the goods to be purchased could be viewed in their normally-used condition, instead of being situated for display in the traditional store, for example. As such, potential shoppers could more likely be aware of what the exemplars appear like after normal wearer, washing, cleaning, etc. For example, such item or goods such as a shirt that keeps an attractive shape, color, and/or appearance after a number of washings or during normal wear is more likely to be a suitable exemplar than one that does not. Consider that people will more likely want to purchase long-lasting goods or items. The potential consumers can thereby judge for themselves the quality and/or wearability of the goods, items, and/or services over time, and purchase those goods, items, and/or services that are well-made, attractive, or some other desirable characteristic that is difficult to ascertain in a normal retail scenario where only brand new goods are typically displayed. For instance, it might be more desirable for certain consumers of such goods as, for example, lawn tractors, clothes, electronic goods, computers, displays, etc. to be able to look at normally-used goods, items, and/or services (such as their neighbor's lawn tractors after number of years and determine which goods, items, and/or services last well), and those normally-used goods, items, and/or services that last well are suitable to be used as certain embodiments of exemplars. Additionally, certain embodiments of exemplars can also be new, and be displayed similarly to goods or items and traditional stores. As such, a variety of exemplars can used to represent goods, items, and/or services.

In addition, as described with respect to FIG. 8, certain embodiments of a number of the exemplar merchants or stores can be configured with a common checkout mechanism 802. Such common checkout mechanism 802 can increase the efficiency of the utilization of certain common spaces by exemplar merchants or stores as well as alter the shopping experience, as described in this disclosure with respect to FIG. 8.

In certain instances, by using certain exemplar techniques, the shopper may, by using the exemplars, be able to exemplar shop directly with a manufacturer, a distributor, or a representative. For example, consider that a particular shopper might like the particular hard-to-find goods, items, and/or services. In many instances, it could be more likely that manufacturers or distributors would be aware of how to provide such hard-to-find goods, items, and/or services. The shopper may, instead of traipsing between traditional retailers, vendors, merchants, and/or manufacturers in search of the elusive goods, items, and/or services, transmit such exemplar item information as a captured image, and/or shopper input, to the exemplar merchant and/or store. In certain instances, the first retailer may, upon agreement with the shopper, forward the captured image and/or associated information to other retailers or manufacturers provided they do not have the goods, items, and/or services themselves. As such, such shopping by exemplars can in many instances represent a very-real time savings for shoppers and consumers; and can often allow a potential buyer to get in touch with the correct seller.

As more retailers and/or manufacturers start utilizing exemplars, other retailers and/or manufacturers would be at a competitive disadvantage. Many shoppers (particularly many males) are keenly aware how much time can be taken up by shopping as well as how reactive many embodiments of the exemplar merchants and/or stores could be. As such, retailers and/or manufacturers that can provide such exemplar shopping might likely be highly sought-after.

Certain embodiments or the exemplar shopping could involve tracking purchases as a customer moves through a merchant or store (or any suitable venue) using certain embodiments of the shopping device 102 which the shopper or customer could carry with them. Certain embodiments of the shopping device 102 could be directed a bit more at the boundary-less ubiquitous shopping end point such as to be usable with a variety of exemplar merchants and/or stores. As such, many embodiments of the shopping device 102 could be used in grocery exemplar merchants or stores, hardware exemplar merchants or stores, retail exemplar merchants or stores, other exemplar merchants and/or stores, etc. Certain embodiments of the exemplar shopping could include delivery of the goods, items, and/or services from inventory at some time later in the customer's shopping trip, at the customer's home, at some other location identified by the customer, etc.

Certain embodiments of the shopping device 102 can be utilized to affect shopping. Certain embodiments of the shopping device 102 can indicate the goods, items, and/or services that the shopper or user have indicated that they wish to purchase. In certain embodiments, the shopping device 102 can also indicate the expense of the goods being shopped for, as well those certain particulars about those goods which may be configured depending upon the preference of the user or shopper. In certain embodiments, such indicating of the goods, items, and/or services to be purchased can be equated to converging on filling the shopper's shopping cart while the shopper moves through a shopping venue. A shopper can utilize their shopping device to indicate to the exemplar merchant and/or store those particular goods, items, and/or services that they wish to purchase, consider purchasing, shop for, price, or perform some other action relative thereto. In different embodiments, such utilization of the shopper's shopping cart can be performed as the customer walks through the area controlled by the exemplar merchant and/or store, as the customer is within some common area controlled by at least one exemplar merchants and/or stores, or as the customer is in some area outside the control of any exemplar merchant and/or store at which location the customer or shopper could utilize their shopping device.

In certain embodiments, the shopping device may thereby be used by the shopper or customer as a shopping cart that can be used to shop, purchase, consider purchasing, pricing, considering characteristics of and/or performing other such operations relative to goods, items, and/or services based at least in part on the exemplar. In certain embodiments, the shopping device can have persistence such that it could be used with a variety of exemplar merchants and/or stores. Certain embodiments of the shopping device 102 can provide a variety of functionality such as could be available with on-line shopping techniques such as made popular with Amazon.com. Such functionality of the shopping device 102 may or may not span different vendors, different merchants, and/or different stores. It might be preferable to make certain embodiments of the shopping device applicable to use with as many exemplar merchants and/or stores as practicable, while still providing suitable operations and sufficient security.

Certain embodiments of the exemplar shopping mechanism 100, as described with respect to FIGS. 1 and 5, can utilize the shopping device 102 that can be configured to schedule the goods, items, and/or services to be delivered to check out. In certain embodiments, the shopper or user may or may not place the exemplar in his cart; if he doesn't (perhaps because it is not physically present, or not present in a color or style that the shopper wants), the shopper can purchase the goods, items, and/or services for sale using the shopping device 102. In certain embodiments, an inventory management system can be provided, which in certain instances might span a number of exemplar merchants and/or stores, or might be even excepted on a mall-wide basis and/or even outside of the mall.

In certain embodiments, after the user or shopper completes shopping, the goods, products, and/or services could be delivered to the user or shopper. In the simple case this amounts to bringing it from some other inventory location. The location at which the goods, items, and/or services could be delivered could be within the exemplar merchant and/or store, within another exemplar merchant and/or store, in some outside location, and/or in the home of the user or shopper as determined by the user or shopper, or the exemplar merchant and/or store. In certain embodiments, it will be desirable to provide scheduling such as to be able to provide the goods, items, and/or services to the checkout counter of the exemplar merchant and/or store, the mall, and/or the city or town merchant or store by the time the shopper arrives there.

Certain embodiments of the shopping device 102 can interact, with the exemplar to provide an indication to buy, or consider buying, the goods, items, and/or services. For example, certain embodiments of the shopping device can be utilized to purchase a stocked version corresponding to the exemplar. It is not necessary that the stocked version be identical to the exemplar. For example, an example of the exemplar for food stuff may contain a certain number of goods, items, and/or services, whereas certain ones of the stocked versions may contain more, less, or the same number of goods, items, and/or services. With many bulk, package, or other goods, items, and/or services, many exemplar storage may contain only one instance and indicate variations (e.g., possibly a different number, version, color, etc.) of the goods, items, and/or services.

There can be a large variety between different exemplar merchants and/or stores depending upon the variety between the goods, how many of the goods include bulk or packaged goods, items, and/or services, the quality or expense of the goods, how manual or automatic the retrieval of the goods are by the merchant or store personnel, the acceptance of exemplars by the shoppers, etc. In many instances, it may be desired to ensure that the goods associated with a particular purchaser converge at a particular location (for example, at the merchant's or store's checkout, or at another location such as in another merchant or store or restaurant, at some remote locations such as indicated by the customer, or to be delivered at the home of the customer). By using certain embodiments of the shopping device 102, a salesperson can be requested.

As such, in certain embodiments, it would be envisioned that goods purchased utilizing exemplars with one merchant or store, perhaps even utilizing positional information such as provided by the shopper (e.g., such information as the customer is now in Sears, or at home after leaving the exemplar merchant and/or store, etc.), or alternately utilizing positional information such as could be provided, perhaps even by an integrated or separate positioning device of the shopping device 102 such as could utilize the global positioning system. In certain merchant or store embodiments, only exemplars might be displayed to shoppers. In other merchant or store embodiments, thereby appropriate exemplars can be considered as representative goods, items, and/or services, and can be compared by or with other actual goods in a similar state or condition. In certain embodiments, merchants or stores may include shelves effectively stocked with exemplars which can be utilized to order goods.

In certain embodiments, the shopping device 102 can include, for example, a wireless or cellular phone, an image can be captured of the exemplar, and the goods, items, and/or services to be purchase can correspond to the exemplar. A variety of embodiments of the shopping device 102 can be provided that include, but are not limited to, a phone, a personal display assistant (PDA), or even a merchant or store-issued device. In certain embodiments, an image of the exemplar can be captured with a camera, camcorder, picturephone, etc., and an image recognizing driver that can be situated between a phone and a website can be used to shop for the exemplar.

In certain embodiments, exemplar shopping can provide for purchasing and/or paying for goods, items, and/or services outside of the physical merchant or store that is selling, considering selling, or offering for sale the goods, items, and/or services. Exemplar shopping can involve purchasing at different locations within multiple merchants or stores. For example, a portion of a mall can include a single cash register, perhaps situated outside of each merchant or store or perhaps located in one or more of the merchants or stores, at which a person can pay for goods or services being purchased by a single merchant or store. As a shopper walks or travels perhaps within a single exemplar merchant and/or store, between exemplar merchants or store, outside of the exemplar merchants or store, they can pick up (or alternatively scan for pricing) goods, items, and/or services that they may wish to purchase.

In certain instances, the goods, items, and/or services may be made available in displays (or exemplars of goods, items, and/or services). In certain embodiments, the user can capture images or obtain other capturing information that can be used to shop for corresponding goods either at that time or at some later date. Either the goods, items, and/or services could be purchased at the time of scanning with the shopping device, or as the shopper passes through checkpoints. In certain embodiments, the checkpoints can be scattered all over at a variety of locations within the exemplar merchant and/or store, within another exemplar merchant and/or store, and/or at some location outside of the exemplar merchant and/or store.

In certain embodiments, the goods, items, and/or services that have been "scanned" using the shopping device to represent purchasing, and the ones that have not been purchased yet and yet may be purchased automatically (or with some interaction on the device) may be purchased at the checkpoint. Such purchasing can be effected, e.g., by presenting a list of the shopped goods, items, and/or services which the shopping control mechanism 106 indicates that it believes the customer has not bought the goods, items, and/or services yet. If there is some disagreement between the shopping control mechanism 106, the shopping device 102, and/or the user or customer as to the goods, items, and/or services being indicated to be purchased, then such disagreements can be discussed or remedied at the checkpoint. As such, a variety of interactions are possible between the user or shopper, the shopping control mechanism 106, and/or the shopping device 102. Inside certain embodiments of the exemplar merchant and/or store, some optimization can be provided by such interaction between the shopping device 102 and the shopping control mechanism 106 to affect seamless shopping and/or checkout between multiple exemplar merchants and/or stores, if so desired. Outside the exemplar merchant and/or store, the interaction between the shopping control mechanism 106 and the shopping device 102 can provide for an increased competition between multiple merchants or stores. Certain embodiments of the exemplar merchant and/or store may generally be able to offer an increased variety and/or respond more efficiently to their customer's desires and/or demands.

The shopping control mechanism 106 can utilize a variety of configurations. In certain embodiments, a standardized infrastructure can be established between the shopping devices 102 and the shopping control mechanisms 106. As such, a single user or shopper could use their shopping device 102 with multiple shopping control mechanisms 106 with different merchants, stores, vendors, retailers, manufacturers, etc. Certain embodiments of the merchants, stores, vendors, retailers, manufacturers could also utilize a web-site-based merchant or store, in which instance communication over the phone (cellular, wireless, or wired-based) and/or computer can recognize items. goods, and/or services being provided such as with the existing infrastructure (e.g., bar codes). In certain embodiments, the shopper could communicate with the merchant's or store's website, and utilize an electronic version of the exemplar shopping mechanism 100. Such an electronic embodiment of the exemplar shopping mechanism 100 could develop into a widely-deployed infrastructure, but such an infrastructure is not necessary to implement the exemplar shopping mechanism 100. In certain embodiments, the electronic version of the exemplar shopping mechanism 100 can equate to a merging of models between shopping over the web and shopping for the goods, items, and/or services.

Certain embodiments of the exemplar shopping can decrease shoplifting. For instance, exemplars can be modified to, remove the value of the goods, items, and/or services to be sold. For example, an exemplar for a packaged can of soup can include that can itself, with the contents emptied and/or replaced. Since the actual goods, items, and/or services of value that are being sold by the merchant or store can be maintained at some remote location (e.g., the stock room or safe of the merchant or store). As such, certain potential shoplifters would not be able to come in contact with the goods, items, and/or services of value to certain embodiments of the exemplar merchant or store.

VII. Certain Embodiments of Exemplar Shopping with Relevant Flowcharts

Figure 12:
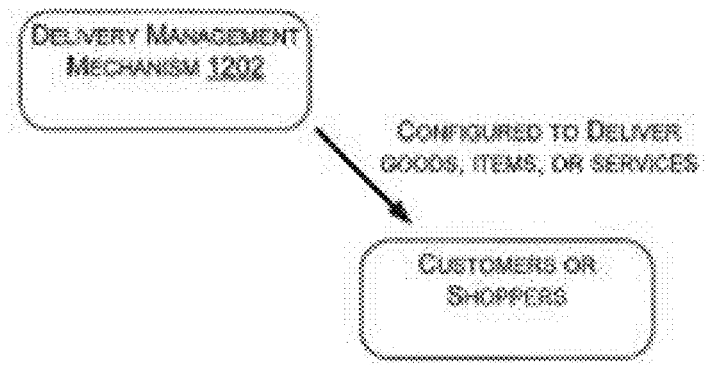
FIG. 12 shows a block diagram including one embodiment of a delivery management mechanism.

FIG. 12 shows one embodiment of a delivery management mechanism 1202 that can be in certain embodiments be situated in the shopping control mechanism or an agent thereof as described with respect to FIG. 1. In certain embodiments, the delivery management mechanism 1202 can be configured to deliver goods, offer for sale, consider selling, sell, items, and/or services to customers and/or shoppers situated at the shopping device 102. In certain instances, the delivery management mechanism 1202 can be at least partially under the control of the exemplar merchant and/or store (and/or an agent thereof) as described in this disclosure. In certain embodiments, the customers or services could be situated within the exemplar merchant and/or store, at their home, at some other location such as at their home, office, restaurant, on-line communicating with the exemplar merchant or store (or an agent thereof), etc.

Figure 11A:
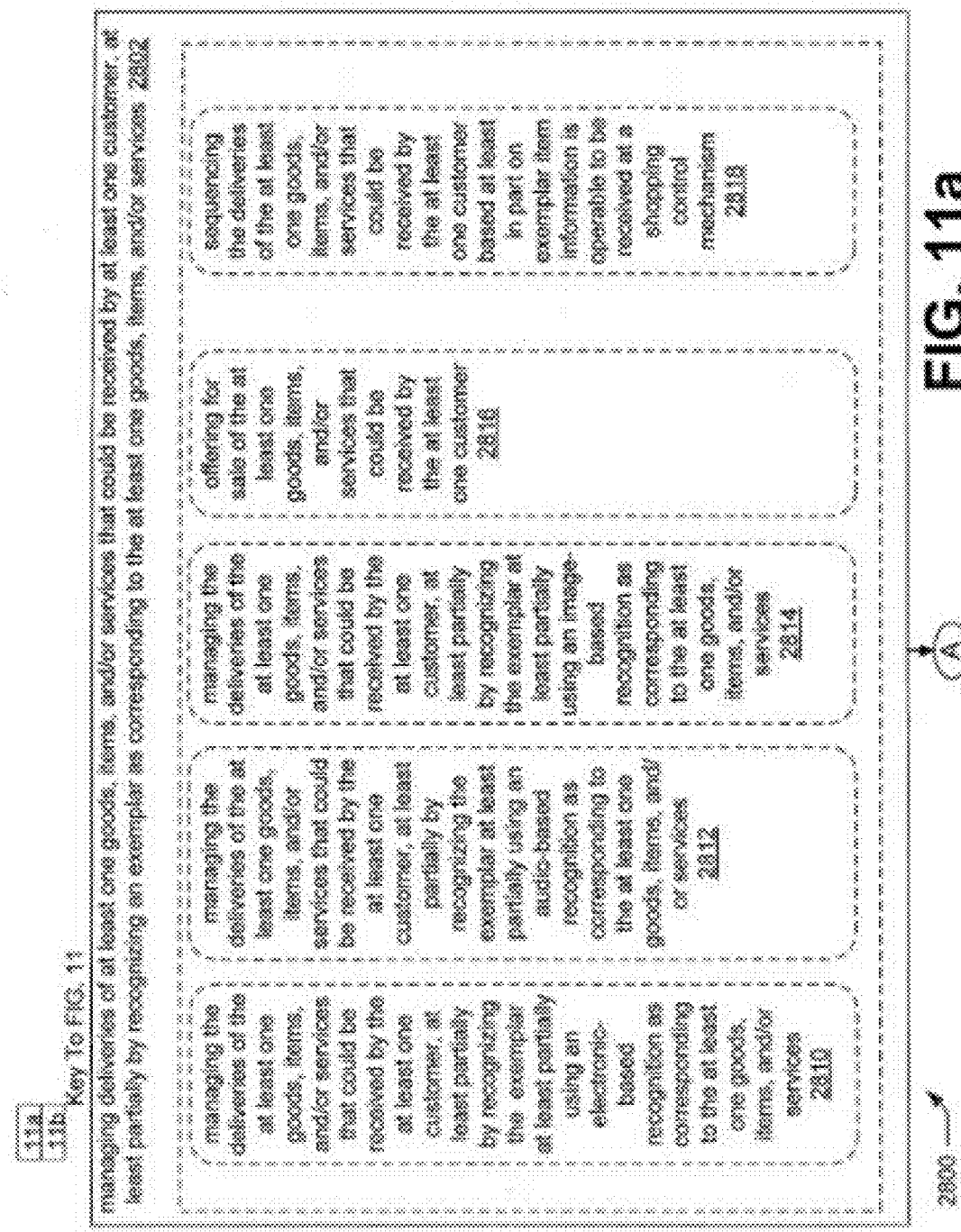
FIGS. 11*a* and 11*b* is a flow chart of an embodiment of a delivery management technique.
Figure 11B:
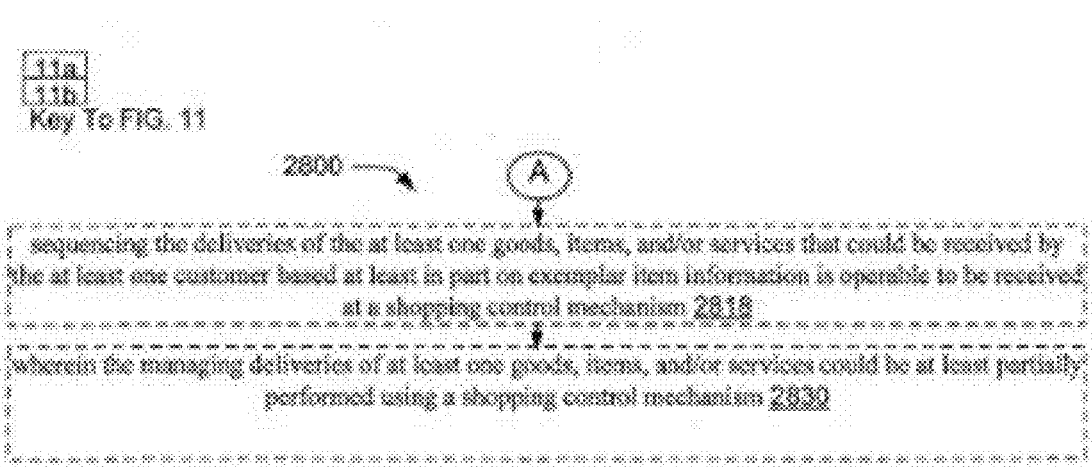

One embodiment of a high-level flowchart of a delivery management technique 2800 is described with respect to FIG. 11 (including FIGS. 11*a* and 11*b*) and includes, but is not limited to, operation 2802 and optional operation 2830. One embodiment of operation 2802 can include, but is not limited to, optional operations 2810, 2812, 2814, 2816, and/or 2818. The high-level flowchart of FIG. 11 (including FIGS. 11*a* and 11*b*) should be considered in combination with the embodiment of the delivery management mechanism 1202, as described with respect to FIG. 12. One embodiment of operation 2802 can include, but is not limited to, managing deliveries of at least one goods, items, and/or services that could be received by at least one customer, at least partially by recognizing an exemplar as corresponding to the at least one goods, items, and/or services. For example, certain embodiments of the exemplar shopping mechanism 100 can be configured to manage deliveries of the goods, items, and/or services, such as from the shopping control mechanism 106 to a number of the shopping devices 102 as described with respect to FIG. 1. One embodiment of the managing deliveries of at least one goods, items, and/or services that could be received by at least one customer, at least partially by recognizing an exemplar as corresponding to the at least one goods, items, and/or services of operation 2802 can include operation 2810, that can include, but is not limited to, managing the deliveries of the at least one goods, items, and/or services that could be received by the at least one customer, at least partially by recognizing the exemplar at least partially using an electronic-based recognition as corresponding to the at least one goods, items, and/or services. For example, managing the deliveries of the goods, items, and/or services such as the exemplar to be at least partially recognized using electronic-based recognition techniques. One embodiment of the managing deliveries of at least one goods, items, and/or services that could be received by at least one customer, at least partially by recognizing an exemplar as corresponding to the at least one goods, items, and/or services of operation 2802 can include operation 2812, that can include, but is not limited to, managing the deliveries of the at least one goods, items, and/or services that could be received by the at least one customer, at least partially by recognizing the exemplar at least partially using an audio-based recognition as corresponding to the at least one goods, items, and/or services. For example, managing the deliveries of the goods, items, and/or services such as the exemplar to be at least partially recognized using audio-based recognition techniques. One embodiment of the managing deliveries of at least one goods, items, and/or services that could be received by at least one customer, at least partially by recognizing an exemplar as corresponding to the at least one goods, items, and/or services of operation 2802 can include operation 2814, that can include, but is not limited to, managing the deliveries of the at least one goods, items, and/or services that could be received by the at least one customer, at least partially by recognizing the exemplar at least partially using an image-based recognition as corresponding to the at least one goods, items, and/or services. For example, managing the deliveries of the goods, items, and/or services such as the exemplar to be at least partially recognized using image-based recognition techniques. One embodiment of the managing deliveries of at least one goods, items, and/or services that could be received by at least one customer, at least partially by recognizing an exemplar as corresponding to the at least one goods, items, and/or services of operation 2802 can include operation 2816, that can include, but is not limited to, offering for sale of the at least one goods, items, and/or services that could be received by the at least one customer. For example, offering the at least one goods, items, and/or services for sale, such as from certain embodiments of the shopping control mechanism 106. One embodiment of the managing deliveries of at least one goods, items, and/or services that could be received by at least one customer of operation 2802 can include operation 2818, that can include but is not limited to, sequencing the deliveries of the at least one goods, items, and/or services that could be received by the at least one customer based at least in part on exemplar item information is operable to be received at a shopping control mechanism. For example, sequencing deliveries of the at least one goods, items, and/or services based at least a part on exemplar item information such as could be received at certain embodiments of the shopping control mechanism. One embodiment of operation 2830 can include, but is not limited to, wherein the managing deliveries of at least one goods, items, and/or services could be at least partially performed using a shopping control mechanism. For example, wherein the managing deliveries of the at least one goods, items, and/or services is at least partially performed using certain embodiments of the shopping control mechanism 106. The order of the operations, methods, mechanisms, etc. as described with respect to FIG. 11 (including FIGS. 11a and 11b) are intended to be illustrative in nature, and not limited in scope.

FIG. 14 shows one embodiment of a considering selling mechanism 1402 that can be in certain embodiments be situated at least in part in the shopping control mechanism or at an agent thereof (as described with respect to FIG. 1). In certain embodiments, the considering selling mechanism 1402 can be configured to sell, offer for sale, or consider selling goods, items, and/or services to customers and/or shoppers that might be situated at the shopping device 102. In certain instances, the considering selling mechanism 1402 can be at least partially under the control of the exemplar merchant and/or store (and/or an agent thereof) as described in this disclosure. In different embodiments, the customers or services could be situated within the exemplar merchant and/or store, at their home, at some other location such as at their home, office, restaurant, on-line communicating with the exemplar merchant or store (or an agent thereof), etc.

One embodiment of a high-level flowchart of an exemplar technique 3200 is described with respect to FIG. 13 and includes, but is not limited to, operation 3202. The high-level flowchart of FIG. 13 should be considered in combination with the embodiment of the considering selling mechanism 1402, as described with respect to FIG. 14. One embodiment of operation 3202 can include, but is not limited to, considering selling goods, items, and/or services from an exemplar merchant and/or store at least partially utilizing an exemplar item information as derived from a customer's previous history, wherein at least some of the exemplar item information as derived from the customer's previous history could be stored in certain embodiments of at least a portion of a shopping control mechanism. For example, a number of embodiments of the shopping control mechanism 106 are described in this disclosure such as could be associated with the exemplar merchant and/or store. In certain instances, the customer can consider purchasing goods, items, and/or services such as by pricing, submitting an offer to purchase, submitting monetary funds, etc. In certain instances, the exemplar item information could be derived from the customer's previous history as stored in certain embodiments of the shopping control mechanism 106. The order of the operations, methods, mechanisms, etc. as described with respect to FIG. 13 are intended to be illustrative in nature, and not limited in scope.

Figure 16:
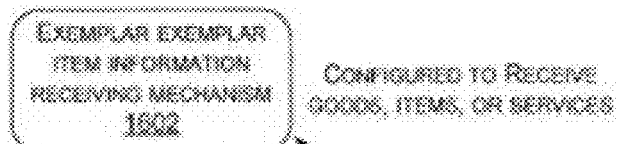
FIG. 16 shows a block diagram including one embodiment of an exemplar item information receiving mechanism.

FIG. 16 shows one embodiment of an exemplar item information receiving mechanism 1602 that can be in certain embodiments be situated at least in part in the shopping control mechanism or at an agent thereof (as described with respect to FIG. 1). In certain embodiments, the exemplar item information receiving mechanism 1602 can be configured to receive goods, items, and/or services to customers and/or shoppers that might be situated at the shopping device 102. In certain instances, the exemplar item \ information receiving mechanism 1602 can be at least partially under the control of the exemplar merchant and/or store (and/or an agent thereof) as described in this disclosure. In certain embodiments, the customers or services could be situated within the exemplar merchant and/or store, at their home, at some other location such as at their home, office, restaurant, on-line communicating with the exemplar merchant or store (or an agent thereof), etc.

Figure 15:
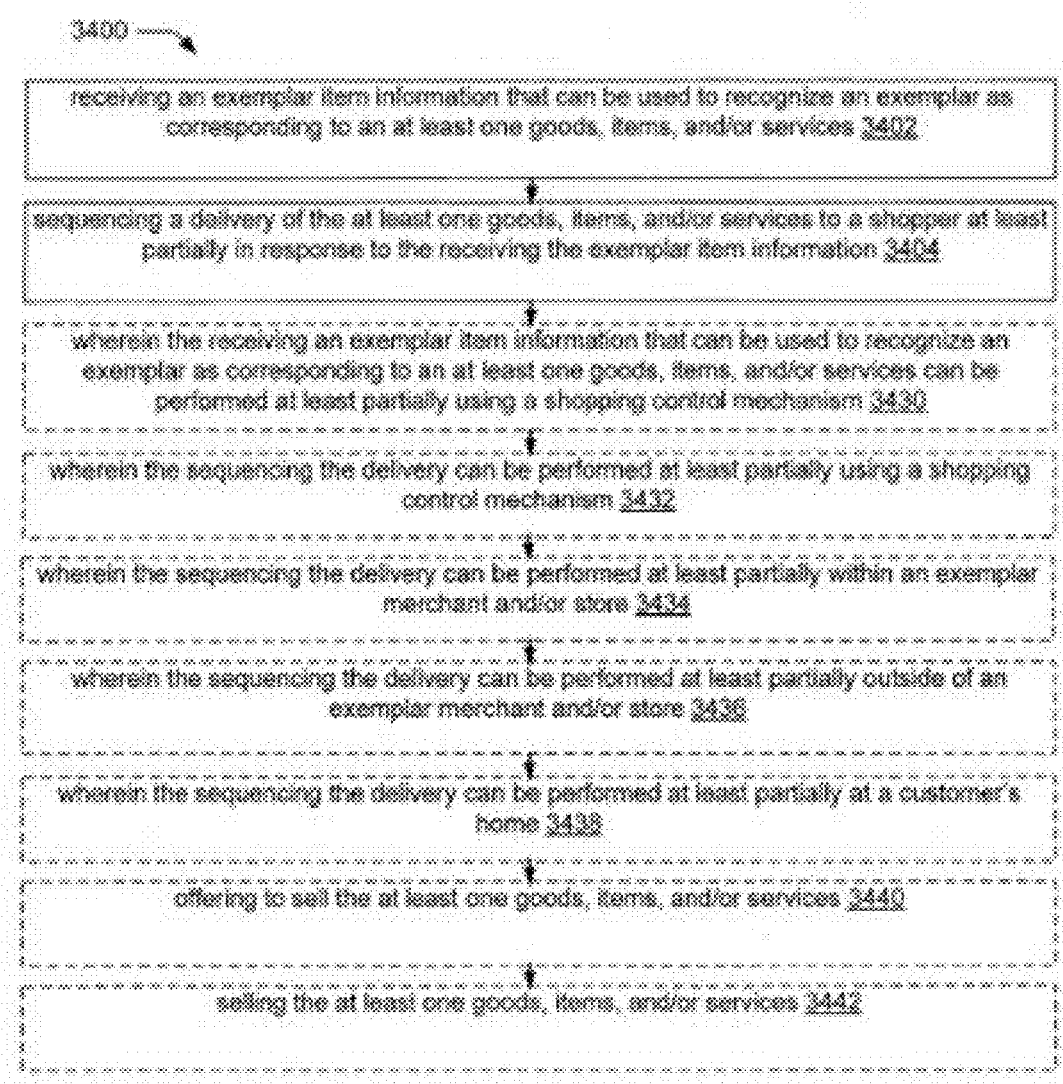
FIG. 15 is a flow chart of an embodiment of an exemplar receiving technique.

One embodiment of a high-level flowchart of an exemplar receiving technique 3400 is described with respect to FIG. 15 and includes, but is not limited to, operations 3402 and 3404, as well as optional operations 3430, 3432, 3434, 3436, 3438, 3440, and/or 3442. The high-level flowchart of FIG. 15 should be considered in combination with the embodiment of the exemplar item information receiving mechanism 1602, as described with respect to FIG. 16. One embodiment of operation 3402 can include, but is not limited to, receiving an exemplar item information that can be used to recognize an exemplar as corresponding to an at least one goods, items, and/or services. For example, exemplar item information can be used to at least partially recognize the exemplar as corresponding to the at least one goods, items, and/or services. One embodiment of operation 3404 can include, but is not limited to, sequencing a delivery of the at least one goods, items, and/or services to a shopper at least partially in response to the receiving the exemplar item information. For example, the delivery of the at least one goods, items, and/or services to a shopper to be sequenced at least partially in response to the receiving the exemplar item information such that, for example, the goods, items, and/or services associated with a particular shopper could all arrive together. As such, goods, items, and/or services should not be intermixed between different shoppers. One embodiment of operation 3430 can include, but is not limited to, wherein the receiving an exemplar item information that can be used to recognize an exemplar as corresponding to an at least one goods, items, and/or services can be performed at least partially using a shopping control mechanism. For example, the shopping control mechanism 106 can be used to recognize the exemplar as corresponding to the at least one goods, items, and/or services. One embodiment of operation 3432 can include, but is not limited to, wherein the sequencing the delivery can be performed at least partially using a shopping control mechanism. For example, sequencing the delivery can be performed at least partially at the shopping control mechanism 106. One embodiment of operation 3434 can include, but is not limited to, wherein the sequencing the delivery can be performed at least partially within an exemplar merchant and/or store. For example, the sequencing the delivery can be performed at least partially at the exemplar merchant and/or store. One embodiment of operation 3436 can include, but is not limited to, wherein the sequencing the delivery can be performed at least partially outside of an exemplar merchant and/or store. For example, the sequencing the delivery can be the performed at least partially outside the exemplar merchant and/or store, and could even be performed by an agent or other individual associated with the exemplar merchant and/or store; or alternatively the customer. One embodiment of operation 3438 can include, but is not limited to, wherein the sequencing the delivery can be performed at least partially at a customer's home. For example, the sequencing the delivery can be performed in certain instances at the customer's home, such as by having a delivery person (or even an agent) deliver the goods, items, and/or services. One embodiment of operation 3440 can include, but is not limited to, offering to sell the at least one goods, items, and/or services. For example, the receiving the exemplar item information can in certain instances be associated with the offering to sell the at least one goods, items, and/or services by the exemplar merchant and/or store or an agent thereof. One embodiment of operation 3442 can include, but is not limited to, selling the at least one goods, items, and/or services. For example, the receiving the exemplar item information can in certain instances be associated with the selling or offering for sale the at least one goods, items, and/or services by the exemplar merchant and/or store or an agent thereof. In one or more various aspects, related systems include but are not limited to circuitry and/or programming for effecting the herein-referenced method aspects; the circuitry and/or programming can be virtually any combination of hardware, software, electromechanical system, and/or firmware configurable to effect the herein-referenced method aspects depending upon the design choices of the system designer. The order of the operations, methods, mechanisms, etc. as described with respect to FIG. 15 are intended to be illustrative in nature, and not limited in scope.

FIG. 18 shows one embodiment of an offering for sale mechanism 1802 that can be in certain embodiments be situated at least in part in the shopping control mechanism or at an agent thereof (as described with respect to FIG. 1). In certain embodiments, the offering for sale mechanism 1802 can be configured to sell, offer for sale, or consider selling goods, items, and/or services to customers and/or shoppers that might be situated at the shopping device 102. In certain instances, the offering for sale mechanism 1802 can be at least partially under the control of the exemplar merchant and/or store (and/or an agent thereof) as described in this disclosure. In different embodiments, the customers or services could be situated within the exemplar merchant and/or store, at their home, at some other location such as at their home, office, restaurant, on-line communicating with the exemplar merchant or store (or an agent thereof), etc.

One embodiment of a high-level flowchart of an goods, item, or service selling technique 3600 is described with respect to FIG. 17 and includes, but is not limited to, operations 3602 and optional operations 3630, 3632, and/or 3634. The high-level flowchart of FIG. 17 should be considered in combination with the embodiment of the goods, item, or service to the offering for sale mechanism 1802, as described with respect to FIG. 18. One embodiment of operation 3602 can include, but is not limited to, offering for sale goods, items, and/or services at least in part by a shopping control mechanism, wherein the goods, items, and/or services could be purchased by customers at least partially based on at least one exemplar item information that can be used to recognize an exemplar as corresponding to the goods, items, and/or services. For example, the shopping control mechanism 106 can offer for sale goods, items, and/or services, wherein the goods, items, and/or services could have been purchased remotely or otherwise. One embodiment of operation 3630 can include, but is not limited to, wherein the at least one exemplar item information can be derived at least in part from a customer's previously derived exemplar shopping history. For example, the customer's previously derived shopping history could, in different embodiments, be maintained in the shopping control mechanism 106, the shopping device 102, and/or some intermediate device. In certain instances, the customer's shopping history can be used to at least partially derive the exemplar item information. One embodiment of operation 3632 can include, but is not limited to, wherein the offering for sale goods, items, and/or services at least in part utilizing a shopping control mechanism which at least partially uses the at least one exemplar item information that is derived from a customer's previously derived exemplar shopping history. For example, the offering for sale goods, items, and/or services can at least in part to utilize certain embodiments of the shopping control mechanism. One embodiment of operation 3634 can include, but is not limited to, further comprising delivering the goods, items, and/or services that have been purchased by a customer at least partially using the at least one exemplar item information derived from the customer's previously derived exemplar shopping history. For example, the customer's previously derived exemplar shopping history is at least partially utilized in delivering the goods, items, and/or services. The order of the operations, methods, mechanisms, etc. as described with respect to FIG. 17 are intended to be illustrative in nature, and not limited in scope.

Figure 19:
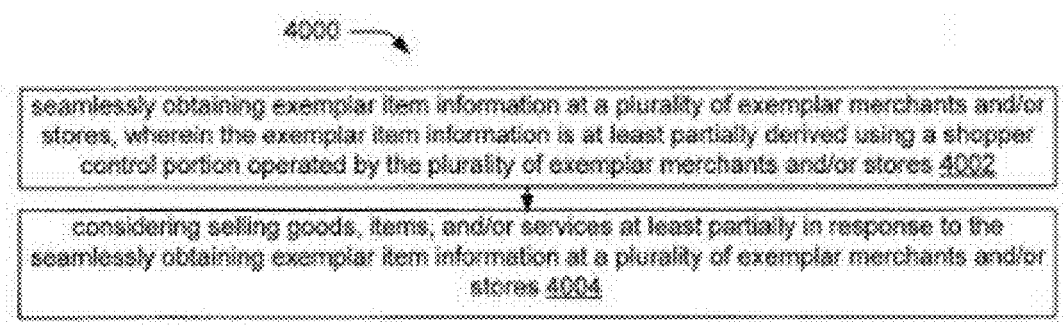
FIG. 19 is a flow chart of an embodiment of an offering for sale technique.

One embodiment of a high-level flowchart of a considering selling technique 4000 is described with respect to FIG. 19 and includes, but is not limited to, operations 4002 and 4004. The high-level flowchart of FIG. 19 should be considered in combination with the embodiment of the goods, item, or service to the considering selling mechanism 1402, as described with respect to FIG. 14. One embodiment of operation 4002 can include, but is not limited to, seamlessly obtaining exemplar item information at a plurality of exemplar merchants and/or stores, wherein the exemplar item information is at least partially derived using a shopper control portion operated by the plurality of exemplar merchants and/or stores. For example, the exemplar merchant or store obtains exemplar item information as provided by the customer or shopper. One embodiment of the operation 4004 can include, but is not limited to considering selling goods, items, and/or services at least partially in response to the seamlessly obtaining exemplar item information at a plurality of exemplar merchants and/or stores. For example, the exemplar item store sells, considers selling, or offers for sale the goods, items, or services. The order of the operations, methods, mechanisms, etc. as described with respect to FIG. 19 are intended to be illustrative in nature, and not limited in scope.

Figure 20:
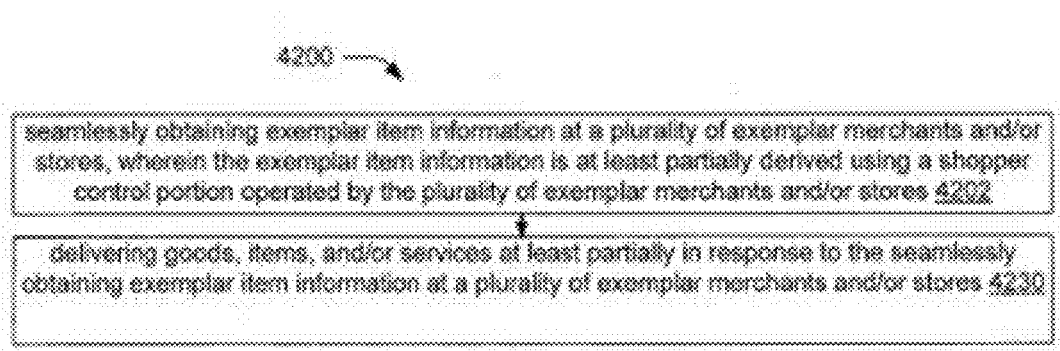
FIG. 20 is a flow chart of an embodiment of an offering for sale technique.

One embodiment of a high-level flowchart of a goods, item, or service selling technique 4200 is described with respect to FIG. 20 and includes, but is not limited to, operations 4202 and 4204. The high-level flowchart of FIG. 20 should be considered in combination with the embodiment of the goods, item, or service to the considering selling mechanism 1402, as described with respect to FIG. 14. One embodiment of operation 4202 can include, but is not limited to seamlessly obtaining exemplar item information at a plurality of exemplar merchants and/or stores, wherein the exemplar item information is at least partially derived using a shopper control portion operated by the plurality of exemplar merchants and/or stores. For example, the exemplar merchant or store obtains exemplar item information as provided by the customer or shopper. One embodiment of operation 4204 can include, but is not limited to delivering goods, items, and/or services at least partially in response to the seamlessly obtaining exemplar item information at a plurality of exemplar merchants and/or stores. For example, the exemplar merchant and/or store delivers the goods, items, and/or service to the user. In certain instances, the delivery of the goods, items, and/or services can be sequenced according to the customer.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

VIII. Certain Embodiments of Exemplar Shopping with Relevant Flowcharts

Figure 21A:
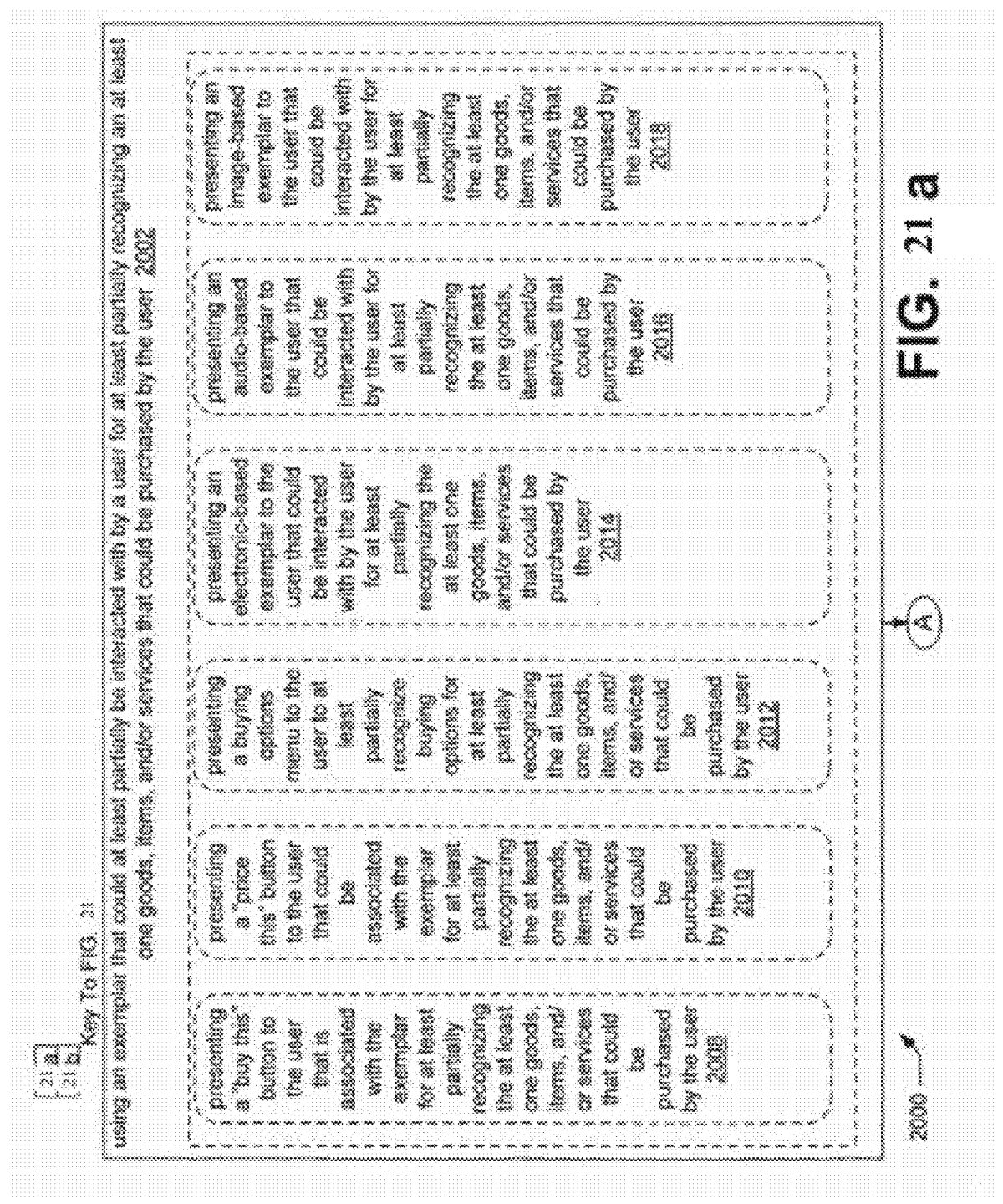
Figure 21:
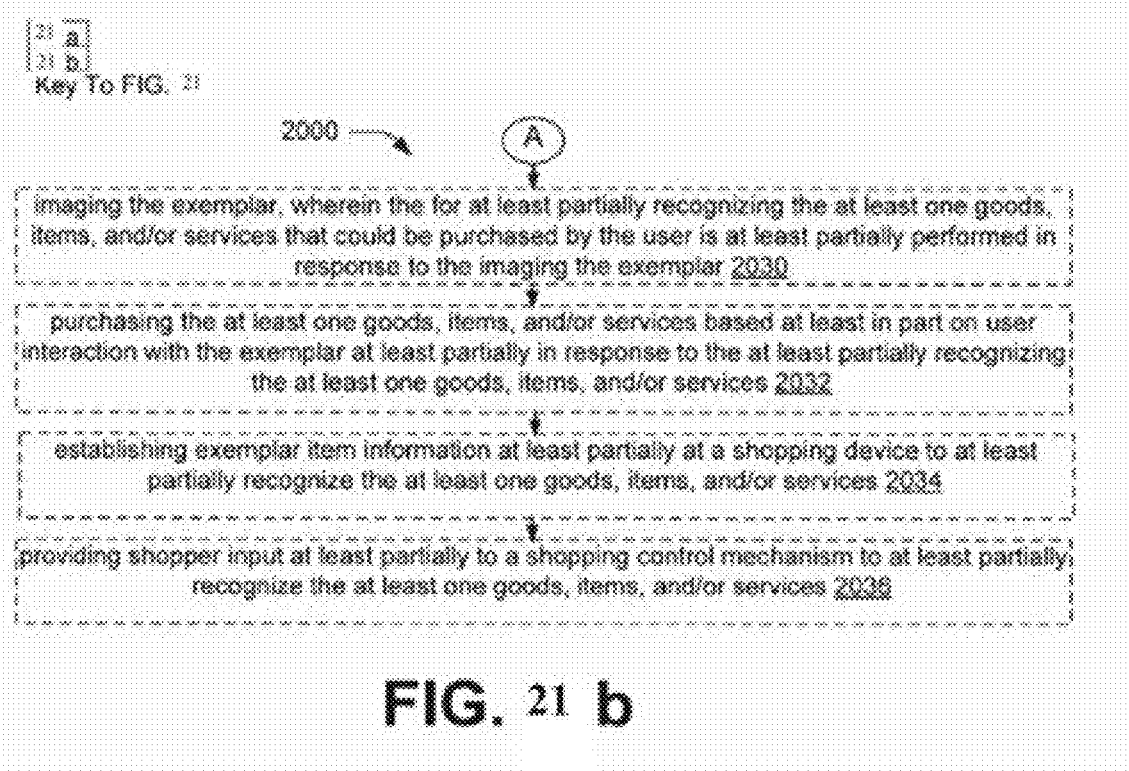
FIG. 21, which includes FIGS. 21 a and 21 b is a flow chart of an embodiment of an exemplar shopping technique.

One embodiment of a high-level flowchart of an exemplar technique 2000 is described with respect to FIG. 21 (including FIGS. 21a and 21b) and includes, but is not limited to, operations 2002 and optional operations 2030, 2032, 2034, and/or 2036. One embodiment of operation 2002 can include, but is not limited to, optional operations 2008, 2010, 2012, 2014, 2016, and/or 2018. The high-level flowchart of FIG. 21 should be considered in combination with the embodiment of the exemplar shopping mechanism 100, as described with respect to FIG. 1. One embodiment of operation 2002 can include, but is not limited to, using an exemplar that could at least partially be interacted with by a user for at least partially recognizing an at least one goods, items, and/or services that could be purchased by the user. For example, the exemplar 104 could be utilized by the shopper or customer to at least partially recognize goods, items, and/or services that are offered to be purchased by the shopper or customer. In certain embodiments, the shopping device 102 and/or the shopping control mechanism 106 can be utilized to recognize the goods, items, and/or services that correspond to the exemplar, as described with respect to FIGS. 1-4. One embodiment of the using an exemplar that could at least partially be interacted with by a user for at least partially recognizing an at least one goods, items, and/or services that could be purchased by the user of operation 2002 can include operation 2008, that can include but is not limited to presenting a "buy this" button to the user that is associated with the exemplar for at least partially recognizing the at least one goods, items, and/or services that could be purchased by the user. For example, certain embodiments of the shopping device can include the "buy this" button. One embodiment of the using an exemplar that could at least partially be interacted with by a user for at least partially recognizing an at least one goods, items, and/or services that could be purchased by the user of operation 2002 can include operation 2010, that can include but is not limited to presenting a "price this" button to the user that could be associated with the exemplar for at least partially recognizing the at least one goods, items, and/or services that could be purchased by the user. For example, the "price this" button could be presented to the user as at least a portion of the shopping device. In certain embodiments, the "price this" button could be fashioned as a portion of a graphical user interface (e.g., GUI), or alternately as a mechanical, electromechanical, or computer-based button. One embodiment of the using an exemplar that could at least partially be interacted with by a user for at least partially recognizing an at least one goods, items, and/or services that could be purchased by the user of operation 2002 can include operation 2012, that can include but is not limited to presenting a buying options menu to the user to at least partially recognize buying options for at least partially recognizing the at least one goods, items, and/or services that could be purchased by the user. For example, buying options could be presented to the user at least partially using the GUI, a mechanical button, an electromechanical button, and/or a computer-based button. One embodiment of the using an exemplar that could at least partially be interacted with by a user for at least partially recognizing an at least one goods, items, and/or services that could be purchased by the user of operation 2002 can include operation 2014, that can include but is not limited to presenting an electronic-based exemplar to the user that could be interacted with by the user for at least partially recognizing the at least one goods, items, and/or services that could be purchased by the user. For example, the exemplar that could be used by a user to at least partially recognize the at least one goods, items, and/or services could at least partially be electronic-based such as by utilizing an electronic-based or computer-based recognition program. One embodiment of the using an exemplar that could at least partially be interacted with by a user for at least partially recognizing an at least one goods, items, and/or services that could be purchased by the user of operation 2002 can include operation 2016, that can include but is not limited to presenting an audio-based exemplar to the user that could be interacted with by the user for at least partially recognizing the at least one goods, items, and/or services that could be purchased by the user. For example, the exemplar that could be used by a user to at least partially recognize the at least one goods, items, and/or services could at least partially be audio-based such as by utilizing an audio-based recognition program. One embodiment of the using an exemplar that could at least partially be interacted with by a user for at least partially recognizing an at least one goods, items, and/or services that could be purchased by the user of operation 2002 can include operation 2018, that can include but is not limited to presenting an image-based exemplar to the user that could be interacted with by the user for at least partially recognizing the at least one goods, items, and/or services that could be purchased by the user. For example, the exemplar that could be used by a user to at least partially recognize the at least one goods, items, and/or services could at least partially be image-based such as by utilizing an image-based recognition program. One embodiment of operation 2030 can include, but is not limited to, imaging the exemplar, wherein the for at least partially recognizing the at least one goods, items, and/or services that could be purchased by the user is at least partially performed in response to the imaging the exemplar. For example, the exemplar could be imaged such as by utilizing imaging, photographic, or other suitable imaging technologies at least as a portion of the recognizing the exemplar as corresponding to the at least one goods, items, and/or services. One embodiment of operation 2032 can include, but is not limited to, purchasing the at least one goods, items, and/or services based at least in part on user interaction with the exemplar at least partially in response to the at least partially recognizing the at least one goods, items, and/or services. For example, the user could purchase the at least one goods, items, and/or services based at least in part on the interaction with the exemplar. One embodiment of operation 2034 can include, but is not limited to, establishing exemplar item information at least partially at a shopping device to at least partially recognize the at least one goods, items, and/or services. For example, the shopping device can establish the exemplar item information, which could include any type of information to indicate a general type of goods, items, and/or services that the exemplar corresponds to. In certain instances, the exemplar item information would thereupon be transmitted to the shopping control mechanism. One embodiment of operation 2036 can include, but is not limited to, providing shopper input at least partially to a shopping control mechanism to at least partially recognize the at least one goods, items, and/or services. For example, the shopper input could be transmitted (e.g., in certain embodiments from the shopping device) to the shopping control mechanism to at least partially assist in recognizing the goods, items, and/or services that correspond to the exemplar. The order of the operations, methods, mechanisms, etc. as described with respect to FIG. 21 (including FIGS. 21a and 21b) is intended to be illustrative in nature, and not limited in scope.

Figure 22:
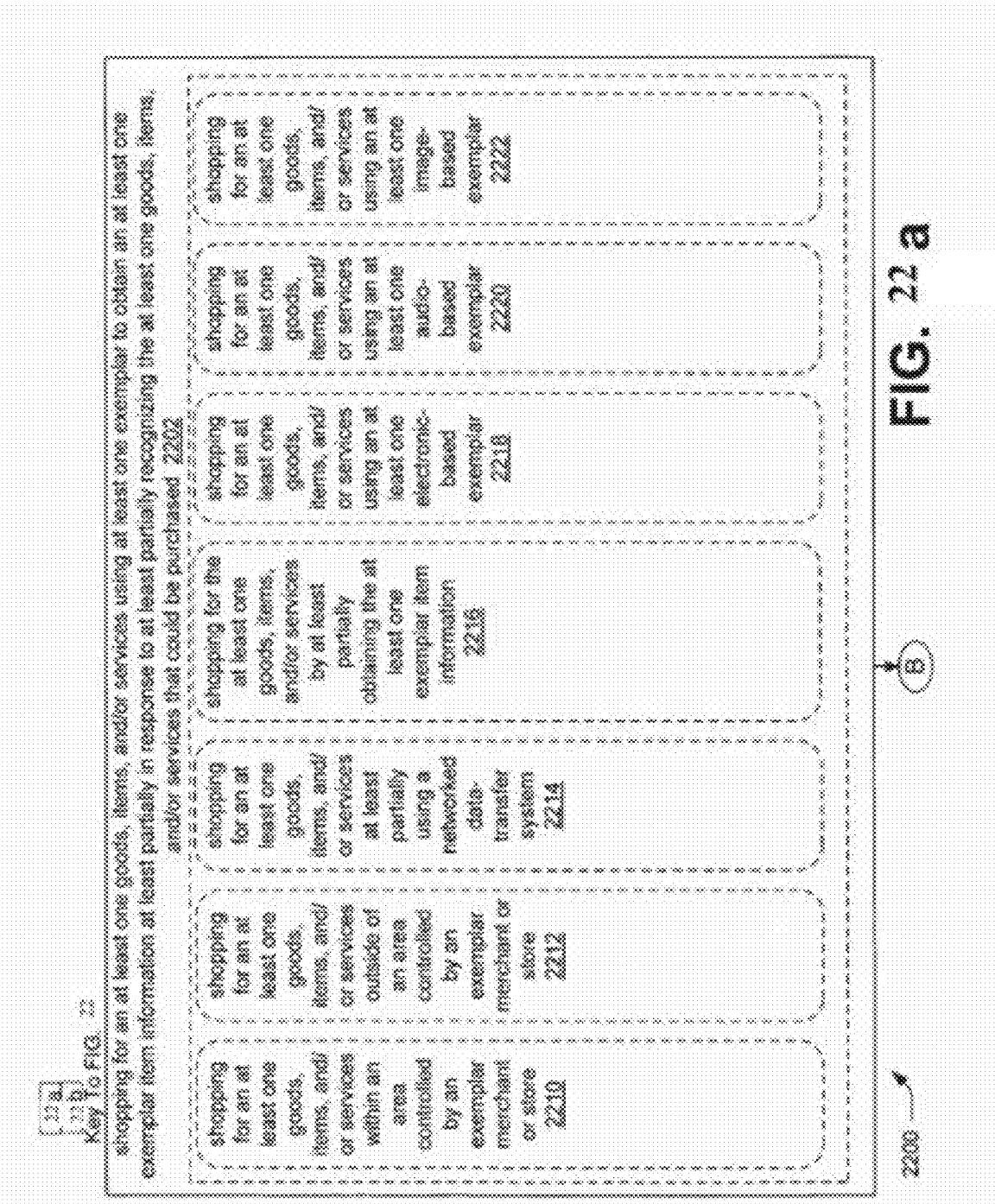
FIG. 22, which includes FIGS. 22 a and 22 b is a flow chart of another embodiment of an exemplar shopping technique.
Figure 22:

One embodiment of a high-level flowchart of an exemplar technique 2200 is described with respect to FIG. 22, which includes FIGS. 22a and 22b, and includes, but is not limited to, operations 2202 and optional operations 2230, 2232, 2234, 2236, 2238, 2240, 2242, and/or 2244. One embodiment of operation 2002 can include, but is not limited to, optional operations 2210, 2212, 2214, 2216, 2218, 2220, and/or 2222. The high-level flowchart of FIG. 22 should be considered in combination with the embodiment of the exemplar shopping mechanism 100, as described with respect to FIG. 1. One embodiment of operation 2202 can include, but is not limited to, shopping for an at least one goods, items, and/or services using at least one exemplar to obtain an at least one exemplar item information at least partially in response to at least partially recognizing the at least one goods, items, and/or services that could be purchased. For example, a user can use the exemplar for shopping for the at least one goods, items, and/or services at least partially in response to the recognizing the goods, items, and/or services. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2210, that can include, but is not limited to, shopping within an area controlled by an exemplar merchant and/or store for the at least one goods, items, and/or services. For example, the shopping for the at least one goods, items, and/or services can be performed within an area under the control of the exemplar merchant or store, such as but not limited to within the physical store, connected on-line to the store using the Internet, or at some remote event or location where there are representatives who are selling the goods, items, and/or services for the exemplar merchant or store. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2212, that can include, but is not limited to, shopping for the at least one goods, items, and/or services outside of an area controlled by an exemplar merchant and/or store. For example, the shopping for the at least one goods, items, and/or services can be performed outside of an area under the control of the exemplar merchant or store. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2214, that can include, but is not limited to, shopping for the at least one goods, items, and/or services at least partially using a networked data-transfer system. For example, the shopping for the at least one goods, items, and/or services could be performed at least partially using the networked data-transfer system. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2216, that can include, but is not limited to, shopping for the at least one goods, items, and/or services by at least partially obtaining the at least one exemplar item information. For example, the exemplar item information which may be established at the shopping device 102, the shopping control mechanism 106, or at another intermediate device, can be used for shopping for the at least one goods, items, and/or services. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2218, that can include, but is not limited to, shopping for the at least one goods, items, and/or services using an at least one electronic-based exemplar. For example, the shopping for the at least one goods, items, and/or services uses the at least one electronic-based exemplar, which is intended to also cover hardware-based, software-based, and/or firmware based exemplars to obtain the at least one exemplar item information. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2220, that can include, but is not limited to, shopping for the at least one goods, items, and/or services using an at least one audio-based exemplar. For example, shopping for the at least one goods, items, and/or services can utilize the at least one audio-based exemplar to obtain the at least one exemplar item information. One embodiment of the shopping for an at least one goods, items, and/or services using at least one exemplar to obtain an at least one exemplar item information at least partially in response to at least partially recognizing the at least one goods, items, and/or services that could be purchased of operation 2202 can include operation 2222, that can include, but is not limited to, shopping for the at least one goods, items, and/or services using an at least one image-based exemplar. For example, the shopping for the at least one goods, items, and/or services can be performed in response to the imaging the exemplar such as by photographing or imaging the exemplar. One embodiment of operation 2230 can include, but is not limited to, recognizing the at least one exemplar as corresponding to the at least one goods, items, and/or services at least partially in response to the at least partially recognize the at least one goods, items, and/or services that could be purchased. For example, purchasing the goods, items, and/or services at least in part on the user interaction with the exemplar. One embodiment of operation 2232 can include, but is not limited to, purchasing the at least one goods, items, and/or services at least partially using the at least one exemplar at least partially in response to the at least partially recognize the at least one goods, items, and/or services that could be purchased. For example, the at least one goods, items, and/or services can be purchased at least partially using the at least one exemplar. In certain embodiments, the purchasing can be performed at least in part at the shopping device. One embodiment of operation 2234 can include, but is not limited to, providing the exemplar item information that could be used to determine whether the at least one goods, items, and/or services could be purchased. For example, providing the exemplar item information that the user could determine whether the goods, items, and/or services could be purchased. One embodiment of operation 2236 can include, but is not limited to, paying for the at least one goods, items, and/or services. For example, paying for the at least one goods, items, and/or services at least partially using the shopping device 102, the shopping control mechanism 106, and/or some intermediate device in-between. One embodiment of operation 2238 can include, but is not limited to, shopping at least partially by capturing an image of the at least one goods, items, and/or services that could be purchased. For example, shopping by capturing the image (e.g., imaging or photography) of the goods, items, and/or services. One embodiment of operation 2240 can include, but is not limited to, shopping at least partially by inputting using an input device that at least partially establishes the exemplar item information, wherein the input device is physically associated with the at least one goods, items, and/or services that could be purchased. For example, shopping at least partially by inputting with the input device (e.g., the shopping device) that can be physically associated with the at least one goods, items, and/or services. One embodiment of operation 2242 can include, but is not limited to, presenting a shopper with at least one option associated with the at least one goods, items, and/or services. For example, presenting the shopper with the at least one option associated with the at least one goods, items, and/or services such as to consider purchasing, purchase, shop for, or some other operation relative to the goods, items, and/or services. One embodiment of operation 2244 can include, but is not limited to, presenting delivery options associated with the at least one goods, items, and/or services. For example, the delivery options of the at least one goods, items, and/or services can be provided such as at the shopping device 102, at the shopping control mechanism 106, and/or at some intermediate device therebetween. The order of the operations, methods, mechanisms, etc. as described with respect to FIG. 22 are intended to be illustrative in nature, and not limited in scope.

Figure 23:
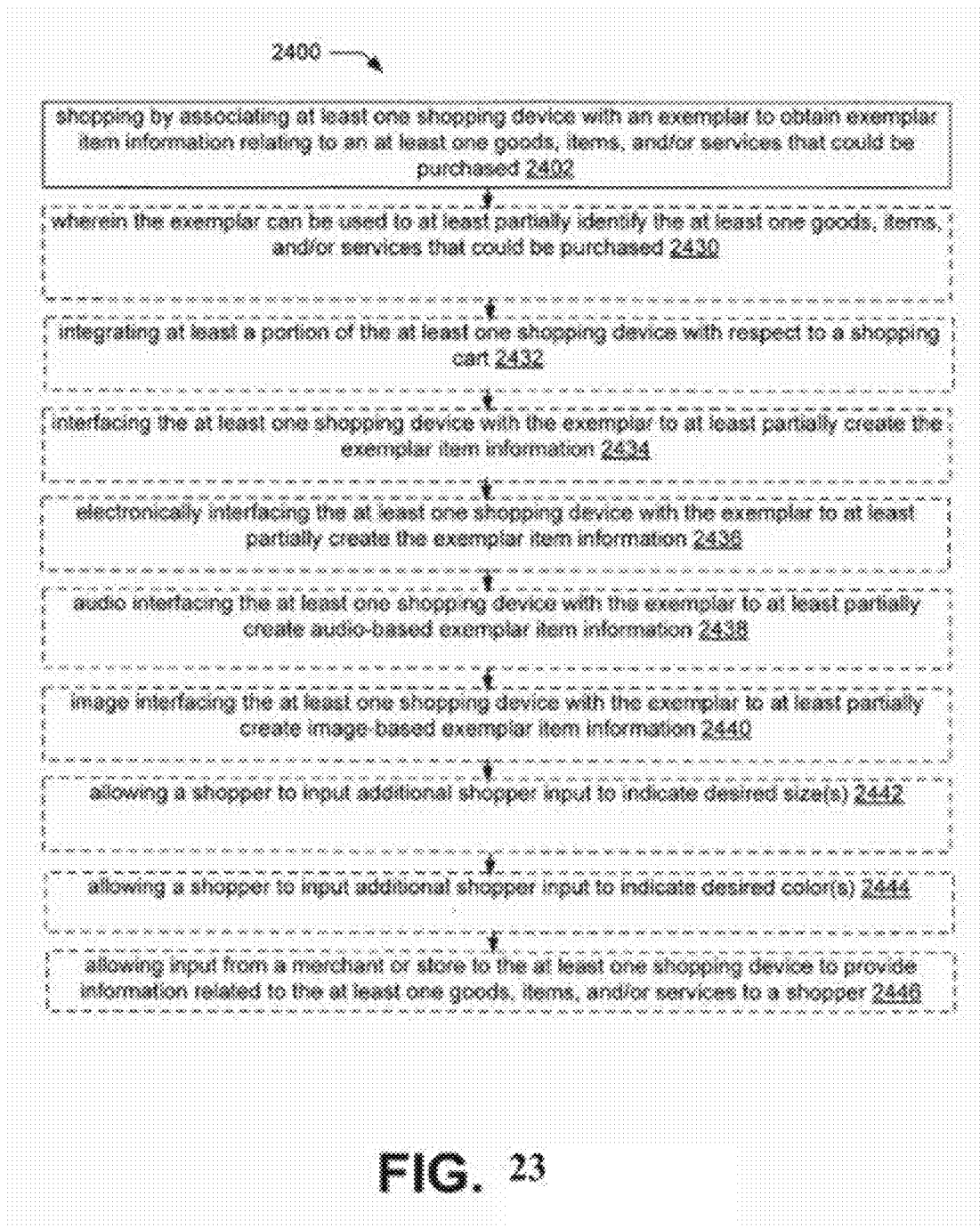
FIG. 23 is a flow chart of yet another embodiment of an exemplar shopping technique.

One embodiment of a high-level flowchart of an exemplar technique 2400 is described with respect to FIG. 23 and includes, but is not limited to, operations 2402 and optional operations 2430, 2432, 2434, 2436, 2438, 2440, 2442, 2444, 2446, 2448, and/or 2450. The high-level flowchart of FIG. 23 should be considered in combination with the embodiment of the exemplar shopping mechanism 100, as described with respect to FIG. 1. One embodiment of operation 2402 can include, but is not limited to, shopping by associating at least one shopping device with an exemplar to obtain exemplar item information relating to an at least one goods, items, and/or services that could be purchased. For example, shopping by associating the at least one shopping device with the exemplar (using, e.g., electronic, audio, and/or imaging techniques), and thereby obtaining the exemplar item information. One embodiment of operation 2430 can include, but is not limited to, wherein the exemplar can be used to at least partially identify the at least one goods, items, and/or services that could be purchased. For example, the exemplar can be used to at least partially identify the least one goods, items, and/or services that could be purchased. One embodiment of operation 2432 can include, but is not limited to, integrating at least a portion of the at least one shopping device with respect to a shopping cart. For example, integrating at least a portion of the at least one shopping device with the shopping cart. One embodiment of operation 2434 can include, but is not limited to, interfacing the at least one shopping device with the exemplar to at least partially create the exemplar item information. For example, interfacing the shopping device with the exemplar device to create the exemplar item information. One embodiment of operation 2436 can include, but is not limited to, electronically interfacing the at least one shopping device with the exemplar to at least partially create the exemplar item information. For example, electronically interfacing the shopping device with the exemplar to at least partially create electronic-based exemplar item information, which could utilize software, hardware, and/or firmware aspects. One embodiment of operation 2438 can include, but is not limited to, audio interfacing the at least one shopping device with the exemplar to at least partially create audio-based exemplar item information. For example, audio interfacing the shopping device with the exemplar to at least partially create audio-based exemplar item information. One embodiment of operation 2440 can include, but is not limited to, image interfacing the at least one shopping device with the exemplar to at least partially create image-based exemplar item information. For example, image interfacing the shopping device with the exemplar to at least partially create image-based exemplar item information. One embodiment of operation 2442 can include, but is not limited to, allowing a shopper to input additional shopper input to indicate desired size(s). For example, the shopper can input shopper input to further specify the desired size of the goods, items, and/or services they are shopping for. One embodiment of operation 2444 can include, but is not limited to, allowing a shopper to input additional shopper input to indicate desired color(s). For example, the shopper can input shopper input further specify the desired color(s) of the goods, items, and/or services they are shopping for. One embodiment of operation 2446 can include, but is not limited to, allowing input from a merchant or store to the at least one shopping device to provide information related to the at least one goods, items, and/or services to a shopper. For example, input can be provided from the exemplar merchant or store (e.g., from the shopping control mechanism 106) to the shopping device 102 to provide information (e.g., query responses, additional information, etc.) related to the at least one goods, items, and/or services to the shopper. The order of the operations, methods, mechanisms, etc. as described with respect to FIG. 23 are intended to be illustrative in nature, and not limited in scope.

Figure 24:
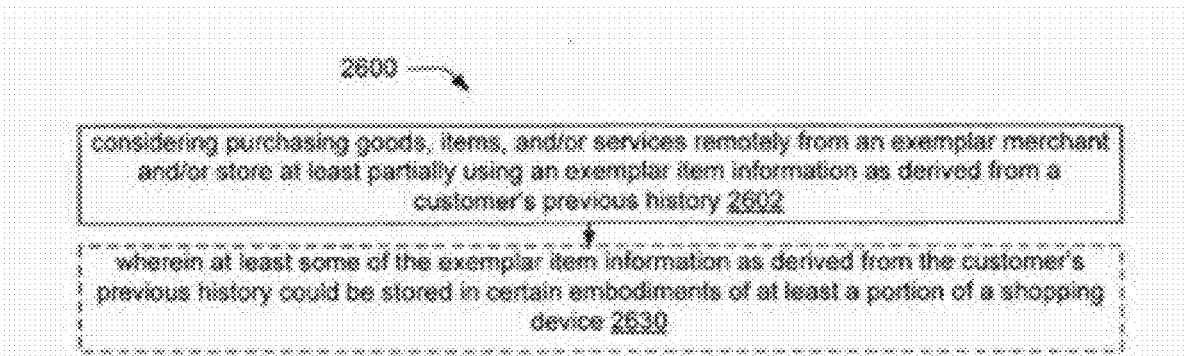
FIG. 24 is a flow chart of yet another embodiment of an exemplar shopping technique.
Figure 25:
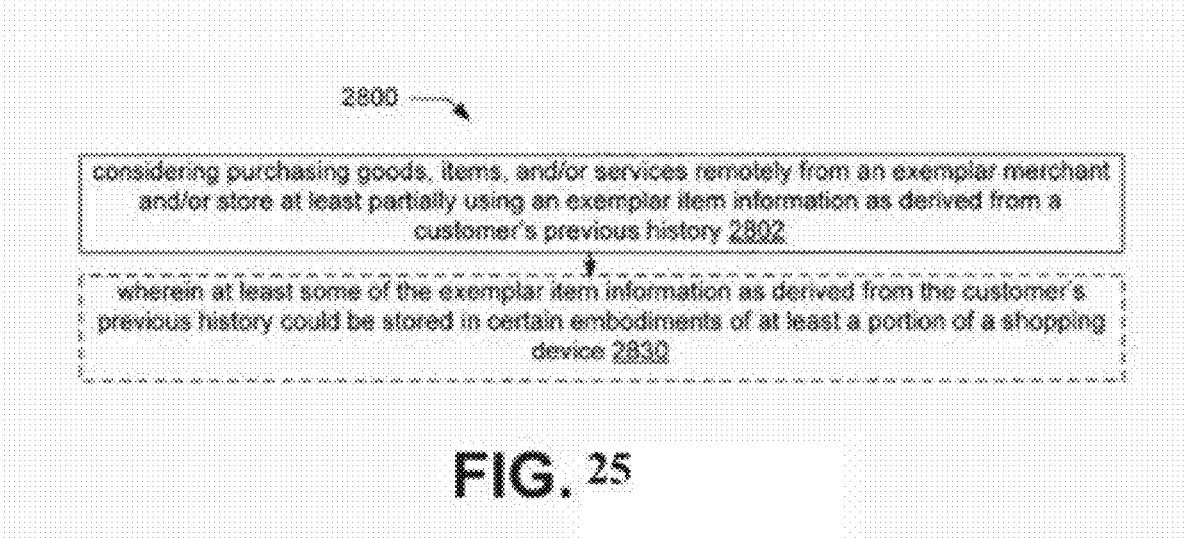
FIG. 25 is a flow chart of yet another embodiment of an exemplar shopping technique.

One embodiment of a high-level flowchart of an exemplar technique 2600 is described with respect to FIG. 24 and includes, but is not limited to, operations 2602 and optional operation 2630. The high-level flowchart of FIG. 24 should be considered in combination with the embodiment of the exemplar shopping mechanism 100, as described with respect to FIG. 1. One embodiment of operation 2602 can include, but is not limited to, considering purchasing goods, items, and/or services remotely from an exemplar merchant and/or store at least partially using an exemplar item information as derived from a customer's previous history. For example, the exemplar item information such as relates to the customer's previous history can be used to consider purchasing goods, items, and/or services. One embodiment of operation 2630 can include, but is not limited to, wherein at least some of the exemplar item information as derived from the customer's previous history could be stored in certain embodiments of at least a portion of a shopping device. For example, the customer's previous history is stored at least in part in certain embodiments of the shopping device. The order of the operations, methods, mechanisms, etc. as described with respect to FIG. 24 are intended to be illustrative in nature, and not limited in scope.

IX. Conclusion

This disclosure provides a number of embodiments of shopping using exemplars. The embodiments of the shopping using exemplars as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer and/or designer of the camouflage positional element(s) and/or the camouflage may opt for mainly a hardware and/or firmware vehicle. In alternate embodiments, if flexibility is paramount, the implementer and/or designer may opt for mainly a software implementation. In yet other embodiments, the implementer and/or designer may opt for some combination of hardware, software, and/or firmware. Hence, there are several possible techniques by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running, on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms, of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more goods, items, and/or services are intended to apply inclusively to either one or a plurality of those goods, items, and/or services.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
   circuitry configured to receive at least one image from at least one shopping device, wherein the at least one image was captured by the at least one shopping device in a first store;
   circuitry configured to receive at least one second image from the at least one shopping device, wherein the at least one second image was captured by the at least one shopping device in a second store;
   circuitry configured to determine, based at least partly on image recognition performed with respect to the at least one image, identification of at least one item;
   circuitry configured to determine, based at least partly on image recognition performed with respect to the at least one second image, identification of at least one second item;
   circuitry configured to facilitate purchase of the at least one item from the first store and the at least one second item from the second store as the shopping device passes through a checkpoint located apart from the first store and the second store; and
   circuitry configured to control at least one distribution mechanism to deliver the at least one item and the at least one second item to at least one location that is at least partly determined using positional information associated with the at least one shopping device.

2. The system of claim 1, wherein the circuitry configured to receive at least one image from at least one shopping device comprises:
   circuitry configured to receive at least one image and shopper input from at least one shopping device.

3. The system of claim 1, wherein the circuitry configured to receive at least one image from at least one shopping device comprises:
   circuitry configured to receive at least one image from at least one mobile phone device.

4. The system of claim 1, wherein the circuitry configured to receive at least one image from at least one shopping device comprises:
   circuitry configured to receive at least one image and at least one of the following types of shopper input from at least one shopping device: size, number, dimension, color, style, manufacturer, pattern, and/or option.

5. The system of claim 1, wherein the circuitry configured to receive at least one image from at least one shopping device comprises:
   circuitry configured to receive at least one still and/or motion image from at least one shopping device.

6. The system of claim 1, wherein the circuitry configured to determine, based at least partly on image recognition performed with respect to the at least one image, identification of at least one item comprises:
   circuitry configured to determine identification of at least one item based at least partly on image recognition performed with respect to the at least one image and based at least partly on at least one of (i) one or more responses to one or more queries, (ii) shopper input, or (iii) location information.

7. The system of claim 1, wherein the circuitry configured to determine, based at least partly on image recognition performed with respect to the at least one image, identification of at least one item comprises:
   circuitry configured to determine, based at least partly on image recognition performed with respect to the at least one image, identification of at least one item and one or more stores, vendors, sellers, and/or manufacturers.

8. The system of claim 1, further comprising:
   circuitry configured to transmit information associated with the at least one item for display.

9. The system of claim 1, further comprising:
   circuitry configured to output at least some of the following types of information associated with the at least one item for display: offer, manufacturer, model identifier, delivery date, and/or price.

10. The system of claim 1, further comprising:
    circuitry configured to output offer information associated with the at least one item for display.

11. The system of claim 1, further comprising:
    circuitry configured to output information associated with the at least one item for display to facilitate one or more selections.

12. The system of claim 1, further comprising:
    circuitry configured to output to the at least one shopping device information associated with the at least one item for display.

13. The system of claim 1, further comprising:
    circuitry configured to monitor global positioning information associated with the at least one shopping device to determine at least one track of the at least one shopping device.

14. The system of claim 13, further comprising:
    circuitry configured to determine the at least one location to deliver the at least one item and the at least one second item based at least partly on the at least one track of the at least one shopping device such that the at least one item is schedulable to arrive at the at least one location prior to the at least one shopping device.

15. The system of claim 1, wherein the circuitry configured to accept payment to the at least one seller for the at least one item comprises:
    circuitry configured to receive information from at least one personal identification card.

16. A system comprising:
    means for receiving at least one image from at least one shopping device, wherein the at least one image was captured by the at least one shopping device in a first store;
    means for receiving at least one second image from the at least one shopping device, wherein the at least one second image was captured by the at least one shopping device in a second store;
    means for determining, based at least partly on image recognition performed with respect to the at least one image, identification of at least one item;
    means for determining, based at least partly on image recognition performed with respect to the at least one second image, identification of at least one second item;
    means for facilitating purchase of the at least one item from the first store and the at least one second item from the second store as the shopping device passes through a checkpoint located apart from the first store and the second store; and
    means for controlling at least one distribution mechanism to deliver the at least one item to at least one location that is at least partly determined using positional information associated with the at least one shopping device.

17. A method comprising:
    receiving at least one image from at least one shopping device, wherein the at least one image was captured by the at least one shopping device in a first store;

receiving at least one second image from the at least one shopping device, wherein the at least one second image was captured by the at least one shopping device in a second store;

determining, based at least partly on image recognition performed with respect to the at least one image, identification of at least one item;

determining, based at least partly on image recognition performed with respect to the at least one second image, identification of at least one second item;

facilitating purchase of the at least one item from the first store and the at least one second item from the second store as the shopping device passes through a checkpoint located apart from the first store and the second store; and controlling at least one distribution mechanism to deliver the at least one item and the at least one second item to at least one location that is at least partly determined using positional information associated with the at least one shopping device.

* * * * *